US 11,412,715 B2

United States Patent
Robinson et al.

(10) Patent No.: US 11,412,715 B2
(45) Date of Patent: Aug. 16, 2022

(54) QUEEN BEE MONITORING CAGE SYSTEM

(71) Applicant: The Board of Trustees of the University of Illinois, Urbana, IL (US)

(72) Inventors: Gene Robinson, Champaign, IL (US); Hagai Y. Shpigler, Urbana, IL (US); Ran Chao, Urbana, IL (US); Allyson M. Ray, State College, PA (US); Alison L. Sankey, Urbana, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 268 days.

(21) Appl. No.: 16/416,033

(22) Filed: May 17, 2019

(65) Prior Publication Data
US 2019/0350175 A1 Nov. 21, 2019

Related U.S. Application Data

(60) Provisional application No. 62/673,342, filed on May 18, 2018.

(51) Int. Cl.
*A01K 47/06* (2006.01)
*A01K 47/04* (2006.01)
(Continued)

(52) U.S. Cl.
CPC .............. *A01K 47/06* (2013.01); *A01K 47/04* (2013.01); *A01K 49/00* (2013.01); *A01K 47/02* (2013.01)

(58) Field of Classification Search
CPC ........ A01K 47/02; A01K 47/04; A01K 47/06; A01K 49/00
(Continued)

(56) References Cited

U.S. PATENT DOCUMENTS

| 137,831 A | * | 4/1873 | Davis | A01K 47/06 449/21 |
| 200,549 A | * | 2/1878 | Lawther | A01K 47/04 449/44 |

(Continued)

FOREIGN PATENT DOCUMENTS

| CN | 105815236 A | 8/2016 |
| CN | 107646746 | * 9/2017 |

(Continued)

OTHER PUBLICATIONS

Angela Kohler and Christian Pirk, A new design for honey bee hoarding cages for laboratory experiments, Jan. 21, 2013, Journal of Apicultural Research, 52(2), pp. 12-14 (Year: 2013).*

(Continued)

*Primary Examiner* — Brady W Frazier
*Assistant Examiner* — Jodutt Basrawi
(74) *Attorney, Agent, or Firm* — Crowell & Moring LLP

(57) ABSTRACT

The present disclosure provides a novel queen monitoring cage system comprising a housing having a plurality of holes to provide ventilation, at least one egg laying plate, serving as an inner wall of the cage. The egg laying plate includes a plurality of hexagonal cells, and one or more ports to allow materials to be added to the housing. Additional embodiments of the system provides a removable drawer for the insertion and removal of bees, and inserts to prevent escape of bees while egg laying plates are added and removed. Experimental results show that the queen monitoring cage can be used to study queen egg laying behavior under laboratory controlled conditions.

18 Claims, 18 Drawing Sheets

(51) Int. Cl.
*A01K 49/00* (2006.01)
*A01K 47/02* (2006.01)

(58) Field of Classification Search
USPC .................................. 449/42, 1, 2, 6, 28
See application file for complete search history.

(56) References Cited

U.S. PATENT DOCUMENTS

| | | | | |
|---|---|---|---|---|
| 224,589 | A * | 2/1880 | Fife | A01K 47/02 449/42 |
| 495,572 | A * | 4/1893 | Warnstorf | B29C 67/241 449/60 |
| 1,224,479 | A | 5/1917 | MacDonald | |
| 1,773,221 | A * | 8/1930 | Davis | A01K 47/04 449/42 |
| 1,882,938 | A * | 10/1932 | Root | A01K 47/04 449/44 |
| 2,223,561 | A * | 12/1940 | Garriga | A01K 47/00 449/5 |
| 4,372,000 | A * | 2/1983 | Hurd | A01K 47/02 449/43 |
| 4,402,099 | A * | 9/1983 | Platt, Jr. | A01K 47/00 449/15 |
| 4,682,380 | A * | 7/1987 | Martin | A01K 49/00 449/7 |
| 4,739,531 | A * | 4/1988 | Robson | A01K 15/02 449/19 |
| 5,830,039 | A * | 11/1998 | Fraser-Jones | A01K 49/00 449/2 |
| 6,450,858 | B1 * | 9/2002 | Schmitz | A01K 47/06 449/20 |
| 6,561,125 | B1 * | 5/2003 | Lohsomboon | A01K 67/033 119/416 |
| 8,066,988 | B1 * | 11/2011 | Teal | A01M 1/103 424/93.51 |
| 8,801,493 | B2 * | 8/2014 | Vincent | A01K 49/00 449/7 |
| 9,826,721 | B2 | 11/2017 | Anderson et al. | |
| 10,863,726 | B2 * | 12/2020 | Anderson | A01K 59/00 |
| 2013/0273807 | A1 * | 10/2013 | Petro | A01K 53/00 449/11 |
| 2014/0144106 | A1 * | 5/2014 | Bazbaz | B32B 3/30 53/461 |
| 2016/0227745 | A1 * | 8/2016 | Reed | A01K 47/02 |
| 2017/0354126 | A1 * | 12/2017 | Lou | A01K 47/04 |

FOREIGN PATENT DOCUMENTS

| | | | | |
|---|---|---|---|---|
| CN | 107646746 | A * | 2/2018 | A01K 51/00 |
| DE | 4222602 | A1 | 1/1994 | |
| DE | 4222690 | C1 * | 1/1994 | A01K 47/04 |
| EP | 0921721 | A1 | 6/1999 | |
| EP | 2204089 | A1 * | 7/2010 | A01K 47/02 |
| KR | 101270698 | B1 * | 6/2013 | |
| KR | 20160061157 | A * | 5/2016 | A01K 51/00 |
| KR | 20170076030 | | * 7/2017 | |
| WO | WO-2012018266 | A1 * | 2/2012 | A01K 51/00 |

OTHER PUBLICATIONS

Woyke, J., Brood-Rearing Efficiency and Absconding in Indian Honeybees, J Apic Res. 1976;15(3/4):133-143.

Calderone NW. Insect Pollinated Crops, Insect Pollinators and US agriculture: Trend analysis of aggregate data for the period 1992-2009. Smagghe G, editor. PLOS One. 2012;7: e37235. doi:10.1371/journal.pone.0037235.

Southwick EE, Southwick L. Estimating the economic value of honey bees (Hymenoptera: Apidae) as agricultural pollinators in the United States. J Econ Entomol. 1992;85:621-33. doi:10.1093/jee/85.3.621.

Aizen MA, Garibaldi LA, Cunningham SA, Klein AM. Long-term global trends in crop yield and production reveal no current pollination shortage but increasing pollinator dependency. Curr Biol. 18:1572-1575. doi:10.1016/j.cub.2008.08.066.

VanEngelsdorp D, Evans JD, Saegerman C, Mullin C, Haubruge E, Nguyen BK, et al. Colony collapse disorder: A descriptive study. PLOS ONE. 2009;4:e6481. doi:10.1371/journal, pone.0006481.

Goulson D, Nicholls E, Botias C, Rotheray EL. Bee declines driven by combined stress from parasites, pesticides, and lack of flowers. Science. 2015;347. Available: http://www.sciencemag.org/content/347/6229/1255957.abstract.

Spivak M, Mader E, Vaughan M, Euliss NH. The plight of the bees. Environ Sci Technol. 2011;45: 34-38.

Tsvetkov N, Samson-Robert O, Sood K, Patel HS, Malena DA, Gajiwala PH, et al. Chronic exposure to neonicotinoids reduces honey bee health near corn crops. Science, dated Jun. 30, 2017;356: 1395-1397. doi:10.1126/science.aam7470.

Woodcock BA, Bullock JM, Shore RF, Heard MS, Pereira MG, Redhead J, et al. Country-specific effects of neonicotinoid pesticides on honey bees and wild bees. Science, dated Jun. 30, 2017 2017;356: 1393-1395. doi:10.1126/science.aaa1190.

Huang ZY, Hanley AV, Pett WL, Langenberger M, Duan JJ. Field and semifield evaluation of impacts of transgenic canola pollen on survival and development of worker honey bees. J Econ Entomol. 2004;97: 1517-1523.

DeGrandi-Hoffman G, Wardell G, Ahumada-Segura F, Rinderer T, Danka R, Pettis J, et al. Comparisons of pollen substitute diets for honey bees: consumption rates by colonies and effects on brood and adult populations. J Apic Res. 2008;47:265-270. doi:10.1080/00218839.2008.11101473.

Cavigli I, Daughenbaugh KF, Martin M, Lerch M, Banner K, Garcia E, et al. Pathogen prevalence and abundance in honey bee colonies involved in almond pollination. Apidologie. 2016;47: 251-266. doi:10.1007/s13592-015-0395-5.

Mullin CA, Frazier M, Frazier JL, Ashcraft S, Simonds R, vanEngelsdorp D, et al. High levels of miticides and agrochemicals in North American apiaries: Implications for honey bee health. PLOS One. 2010;5. doi:10.1371/journal.pone.0009754.

Chauzat M-P, Faucon J-P, Martel A-C, Lachaize J, Cougoule N, Aubert M, et al. A survey of pesticide residues in pollen loads collected by honey bees in France. J Econ Entomol. 2006;99:253-262. doi:10.1093/jee/99.2.253.

Di Pasquale G, Salignon M, Le Conte Y, Belzunces LP, Decourtye A, Kretzschmar A, et al. Influence of pollen nutrition on honey bee health: Do pollen quality and diversity matter? Zeil J, editor. PLOS One. 2013;8: e72016. doi:10.1371/journal.pone.0072016.

Donkersley P, Rhodes G, Pickup RW, Jones KC, Wilson K. Honeybee nutrition is linked to landscape composition. Ecol Evol. 2014;4: 4195-4206. doi:10.1002/ece3.1293.

Navajas M, Migeon A, Alaux C, Martin-Magniette M, Robinson G, Evans J, et al. Differential gene expression of the honey bee *Apis mellifera* associated with Varroa destructor infection. BMC Genomics. 2008;9: 301-301. doi:10.1186/1471-2164-9-301.

Page Jr RE, Erber J, Fondrk MK. The effect of genotype on response thresholds to sucrose and foraging behavior of honey bees (*Apis mellifera* L.). J Comp Physiol A. 1998;182: 489-500. doi:10.1007/s003590050196.

Carreck NL, Ratnieks FLW. The dose makes the poison: have "field realistic" rates of exposure of bees to neonicotinoid insecticides been overestimated in laboratory studies? J Apic Res. 2014;53: 607-614. doi:10.3896/IBRA.1.53.5.08.

Suryanarayanan S. Balancing control and complexity in field studies of neonicotinoids and honey bee health. Insects. 2013;4: 153-167. doi:10.3390/insects4010153.

US EPA O. How we assess risks to pollinators. In: US EPA [Internet]. Sep. 16, 2013, last updated Jun. 8, 2018 [retrieved Jun. 18, 2019]. Available at: https://www.epa.qov/poliinator-protection/how-we-assess-risks-pollinators.

Johnson RM, Ellis MD, Mullin CA, Frazier M. Pesticides and honey bee toxicity—USA. Apidologie. 2010;41: 312-331. doi:10.1051/apido/2010018.

Dively GP, Embrey MS, Kamel A, Hawthorne DJ, Pettis JS. Assessment of chronic sublethal effects of imidacloprid on honey bee colony health. PLOS One. 2015;10: e0118748. doi:10.1371/journal.pone.0118748.

(56) References Cited

OTHER PUBLICATIONS

Sandrock C, Tanadini M, Tanadini LG, Fauser-Misslin A, Potts SG, Neumann P, et al. Impact of chronic neonicotinoid exposure on honeybee colony performance and queen supersedure. PLOS One. 2014;9: e103592. doi: 10.1371/journal.pone.0103592.

Wu-Smart J, Spivak M. Sub-lethal effects of dietary neonicotinoid insecticide exposure on honey bee queen fecundity and colony development. Sci Rep., dated Aug. 26, 2016;6: 32108. doi:10.1038/srep32108.

Moore PA, Wilson ME, Skinner JA. Honey bee queens: Evaluating the most important colony member. Oct. 2015 [cited Jan. 2, 2018], In: extension [Internet]. Available from: http://articles.extension.org/pages/73133/honey-bee-queens:-evaluating-the-most-important-colony-member.

VanEngelsdorp D, Jr JH, Underwood RM, Pettis J. A survey of honey bee colony losses in the U.S., Fall 2007 to Spring 2008. PLOS One. 2008;3: e4071. doi:10.1371/journal.pone.0004071.

VanEngelsdorp D, Tarpy DR, Lengerich EJ, Pettis JS. Idiopathic brood disease syndrome and queen events as precursors of colony mortality in migratory beekeeping operations in the eastern United States. Prev Vet Med. 2013;108: 225-233. doi:10.1016/j.prevetmed. 2012.08.004.

Pettis JS, Rice N, Joselow K, vanEngelsdorp D, Chaimanee V. Colony failure Tinked to low sperm viability in honey bee (*Apis mellifera*) queens and an exploration of potential causative Factors. PLOS ONE, dated Feb. 10, 2016;11: e0147220. doi:10.1371/journal.pone.0147220.

Allen MD. The honeybee queen and her attendants. Anim Behav. 1960;8: 201-208. doi:10.1016/0003-3472(60)90028-2.

Keeling CI, Slessor KN, Higo HA, Winston ML. New components of the honey bee (*Apis mellifera* L.) queen retinue pheromone. Proc Natl Acad Sci. 2003;100: 4486-4491. doi:10.1073/pnas. 0836984100.

Butler CG, Callow RK, Koster CG, Simpson J. Perception of the queen by workers in the honeybee colony. J Apic Res. 1973;12: 159-166. doi:10.1080/00218839.1973.11099744.

Miranda CRE, Bitondi MMG, Simoes ZLP. Effect of proctolin on the egg-laying activity of *Apis mellifera* queens. J Apic Res. 2003;42: 35-38. doi:10.1080/00218839.2003.11101086.

Fine JD, Mullin CA, Frazier MT, Reynolds RD. Field residues and effects of the insect growth regulator novaluron and its major co-formulant N-Methyl-2-Pyrrolidone on honey bee reproduction and development. J Econ Entomol., Sep. 1, 2017;110: 1993-2001. doi:10.1093/jee/tox220.

DeGrandi-Hoffman G, Martin JH. Behaviour of egg-laying virgin and mated queen honey bees (*Apis mellifera* L.) and the composition of brood in their colonies. J Apic Res. 1993;32: 19-26. doi:10.1080/00218839.1993.11101283.

Dunham WE. Temperature gradient in the egg-laying activities of the queen bee. Ohio J Sci. 1930;30. Available: http://hdl.handle.net/1811/2481.

Crailsheim K, Schneider LHW, Hrassnigg N, Bühlmann G, Brosch U, Gmeinbauer R, et al. Pollen consumption and utilization in worker honeybees (*Apis mellifera carnica*): Dependence on individual age and function. J Insect Physiol. 1992;38: 409-419. doi: 10.1016/0022-1910(92)90117-V.

Crailsheim K. The flow of jelly within a honeybee colony. J Comp Physiol B. 1992;162: 681-689. doi:10.1007/BF00301617.

Haydak MH. Honey bee nutrition. Annu Rev Entomol. 1970;15: 143-156. doi:10.1146/annurev.en.15.010170.001043.

Vásquez A, Olofsson TC. The lactic acid bacteria involved in the production of bee pollen and bee bread. J Apic Res. 2009;48:189-195. doi:10.3896/IBRA.1.48.3.07.

Herbert EWJ, Shimanuki H. Chemical composition and nutritive value of bee-collected and bee-stored pollen. Apidologie. 1978;9: 33-40. doi:10.1051/apido:19780103.

Carroll MJ, Brown N, Goodall C, Downs AM, Sheenan TH, Anderson KE, et al. Honey bees preferentially consume freshly-stored pollen. PLOS ONE., dated Apr. 21, 2017;12: e0175933. doi:10.1371/journal.pone.0175933.

Alquarni A. Influence of some protein diets on the longevity and some physiological conditions of honeybee *Apis mellifera* L. Workers. J Biol Sci. 2006;6. doi:10.3923/jbs.2006.734.737.

Al-Ghamdi AA, Al-Khaibari AM, Omar MO. Consumption rate of some proteinic diets affecting hypopharyngeal glands development in honeybee workers. Saudi J Biol Sci. 2011;18: 73-77. doi:10.1016/j.sjbs.2010.10.001.

Free JB. Hypopharyngeal gland development and division of labour in honey-bee (*Apis mellifera* L.) colonies. Proc R Entomol Soc Lond Ser Gen Entomol. 1961;36: 5-8. doi:10.1111/j.1365-3032.1961. tb00253.x.

Dussutour A, Simpson SJ. Description of a simple synthetic diet for studying nutritional responses in ants. Insectes Sociaux. 2008;55: 329-333. doi: 10.1007/s00040-008-1008-3.

Piccirillo GA, De Jong D. The influence of brood comb cell size on the reproductive behavior of the ectoparasitic mite Varroa destructor in Africanized honey bee colonies. Genet Mol Res. 2003;2(1):36-42.

Hrassnigg N, Crailsheim K. Adaptation of hypopharyngeal gland development to the brood status of honeybee (*Apis mellifera* L.) colonies. J Insect Physiol. 1998;44: 929-939. doi:10.1016/S0022-1910(98)00058-4.

Hanley JA, Negassa A, Edwardes MD deB, Forrester JE. Statistical Analysis of Correlated Data Using Generalized Estimating Equations: An Orientation. Am J Epidemiol. 2003;157: 364-375. doi:10.1093/aje/kwf215.

Kaplan M, Karaoglu Ö, Eroglu N, Silici S. Fatty acid and proximate composition of bee bread. Food Technol Biotechnol., Jul. 29, 2016;54: 497-504. doi:10.17113/ftb.54.04.16.4635.

Rivero A, Giron D, Casas J. Lifetime allocation of juvenile and adult nutritional resources to egg production in a holometabolous insect. Proc Biol Sci. 2001;268: 1231-1237. doi:10.1098/rspb.2001.1645.

Giray T, Robinson GE. Effects of intracolony variability in behavioral development on plasticity of division of labor in honey bee colonies. Behav Ecol Sociobiol. 1994;35: 13-20.

Zaritzky NE. Chemical and physical deterioration of frozen foods. In: Skibsted LH, Risbo J, Andersen ML, editors. Chemical deterioration and physical instability of food and beverages. Woodhead Publishing; 2010. p. 561-607. doi:10.1533/9781845699260.3.561.

Dietz A, Stevenson HR. Influence of long term storage on the nutritional value of frozen pollen for brood rearing of honey bees. Apidologie. 1980;11: 143-151. doi:10.1051/apido:19800204.

Robinson GE. Regulation of division of labor in insect societies. Annu Rev Entomol. 1992;37: 637-665. doi: 10.1146/annurev.en.37. 010192.003225.

Huang ZY, Robinson GE. Honeybee colony integration: worker-worker interactions mediate hormonally regulated plasticity in division of labor. Proc Natl Acad Sci U S A. 1992;89: 11726-11729.

DeGrandi-Hoffman G, Gage SL, Corby-Harris V, Carroll MJ, Chambers M, Graham H, et al. Connecting the nutrient composition of seasonal pollens with changing nutritional needs of honey bee (*Apis mellifera* L.) colonies, Jul. 7, 2018, J Insect Physiol 109 (2018) 114-124.

Page RE, Robinson GE. The genetics of division of labour in honey bee colonies. In: Evans PD, editor. Advances in Insect Physiology. Academic Press; 1991. pp. 117-169. doi:10.1016/S0065-2806(08)60093-4.

Zayed A, Robinson GE. Understanding the relationship between brain gene expression and social behavior: Lessons from the honey bee. Annu Rev Genet. 2012;46: 591-615. doi:10.1146/annurev-genet-110711-155517.

Francis RM, Nielsen SL, Kryger P. Patterns of viral infection in honey bee queens. J Gen Virol. 2013;94: 668-676. doi:10.1099/vir. 0.047019-0.

\* cited by examiner

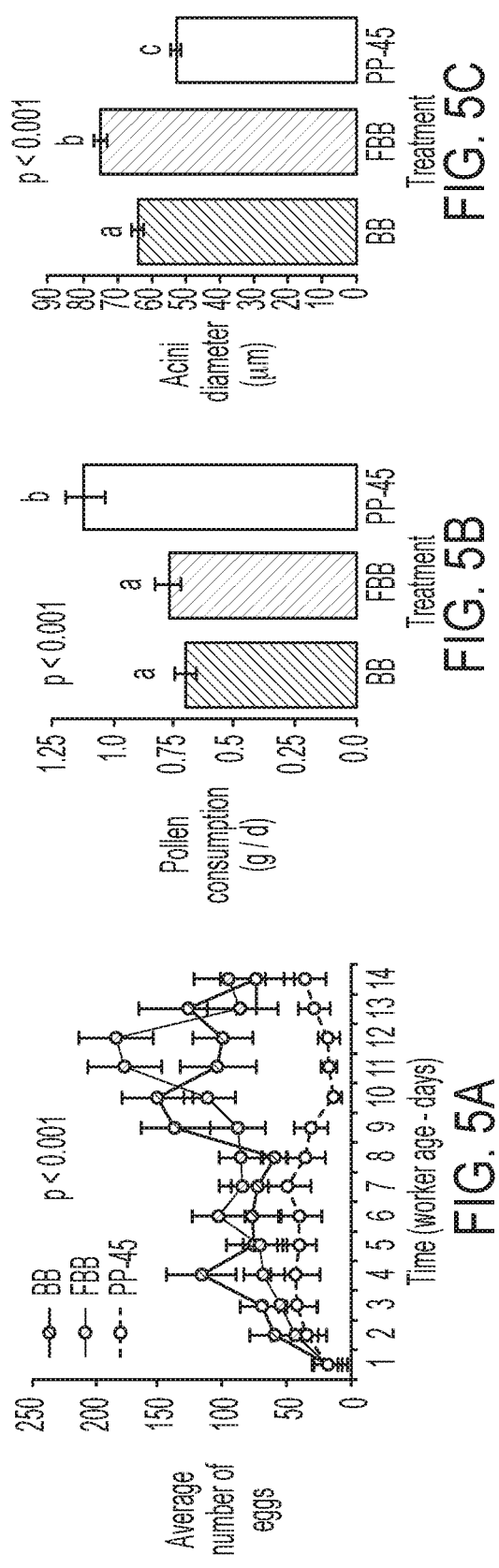
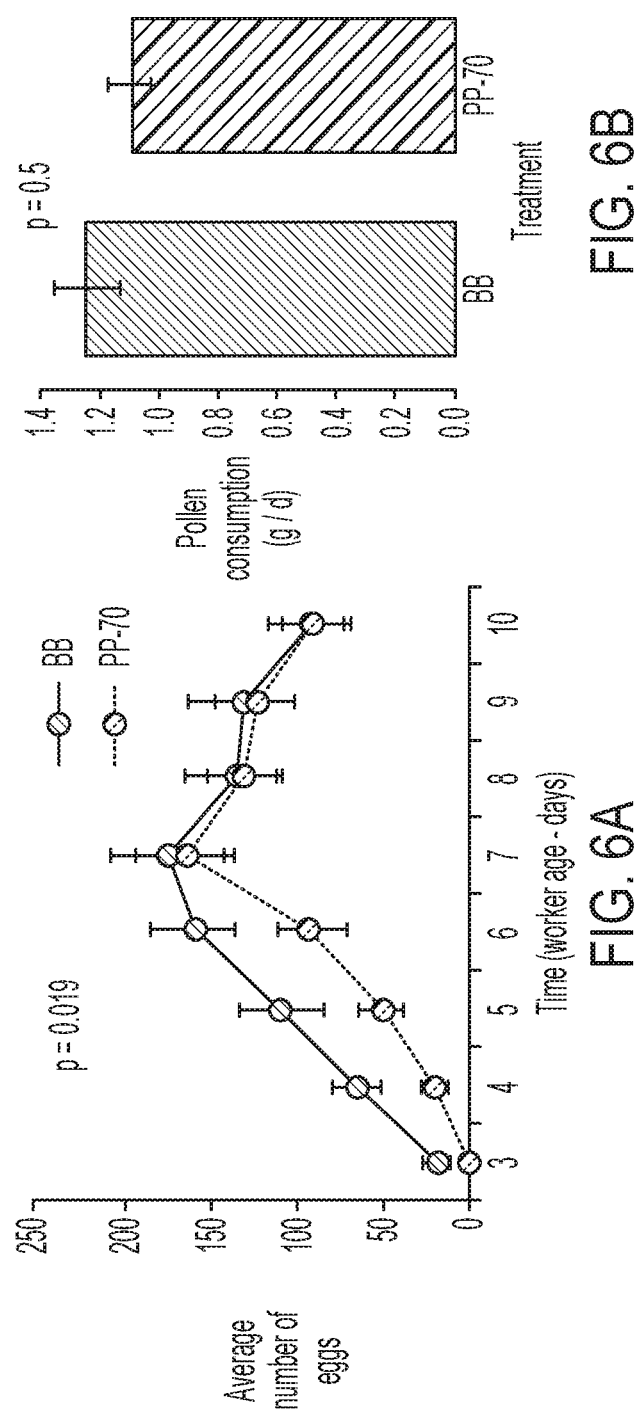

QUEEN BEE MONITORING CAGE SYSTEM

RELATED APPLICATION(S)

The present patent document claims the benefit of priority pursuant to 35 U.S.C. § 119(e) to U.S. Provisional Patent Application No. 62/673,342 filed on May 18, 2018 the contents of which is incorporated herein by reference in its entirety.

STATEMENT REGARDING FEDERALLY SPONSORED RESEARCH OR DEVELOPMENT

This invention was made with government support under HR0011-16-2-0019 awarded by the U.S. Department of Defense. The government has certain rights in the invention.

BACKGROUND

Managed honey bee pollinators contribute an estimated 15 billion dollars yearly to the United States economy, and they have become crucial to ensuring food security for a growing population. However, declines in populations of pollinators, including honey bees, have caused concern, and researchers have now identified four key factors that negatively impact honey bee health: poor nutrition, exposure to pesticides, pathogens, and parasites. Additionally, these stressors can interact in unpredictable ways. The effects of these frequently co-occurring stressors highlight the need for robust methods to assess risks to honey bee health so that they can be mitigated.

BRIEF SUMMARY

To study the effects of individual and interacting stressors on the complex biological processes that occur within a honey bee colony, researchers may conduct field experiments with full size colonies or experimental colonies that have reduced populations or demographics. These experiments produce environmentally relevant data pertaining to colony-level effects, but their designs are often time- and resource-intensive, with challenges in controlling variables such as the effects of agrochemical residues persisting in wax comb and in the surrounding foraging landscapes, the sources of nutrition available to the colony, and bee genetic variation. Laboratory-based assays generally afford researchers more control over experimental parameters, but relevance to whole-colony contexts is generally an issue with honey bees and other social insects.

For many years the Environmental Protection Agency (EPA) relied heavily on acute, laboratory-based tests of adult workers for its toxicological risk assessment of agrochemicals on honey bees. Recently, they have begun to implement a strategy involving laboratory-based tests pertaining to the chronic and acute toxicity of agrochemicals to adult worker bees and larvae. Depending on the results of these tests, additional tests involving whole-colony field experiments may be recommended. While this approach is a marked improvement over acute adult studies alone, key areas of honey bee biology are still neglected, including tests on queen health and fecundity. Effects of agrochemicals on queens have been documented, but there is currently no laboratory-based method to screen for effects on queen egg laying.

In honey bee colonies, the queen is the sole producer of the fertilized eggs necessary for maintaining the colony population. Therefore, the queen's health and productivity are critical to colony longevity. Recently, high rates of queen failure and supersedure have been documented throughout the United States, and beekeepers have reported queen failure as a major cause of colony loss. Several studies have indicated that queen failure could be due to agrochemical exposure or stressful conditions during queen shipment. These observations highlight the need for controlled methods to study the effects of stressors on queen egg laying. But the queen's unique life history poses considerable challenges to researchers seeking to dissect the effects of stressors on queen fecundity from other colony level effects.

The honey bee queen relies on constant care and feeding by young worker bees. This behavior, which is referred to as retinue behavior, is elicited as a response to a semiochemical blend produced by the queen known as queen pheromone. Sustained queen egg laying is not known to occur in the absence of honey bee workers, therefore, egg-laying is the product of the coordinated efforts of both the queen and the workers in the colony. The relatively small number of quantitative studies of queen egg laying behaviors have been performed in full-sized or reduced population colonies, and researchers either cage the queen to restrict her egg laying or use glass-walled observation hives to perform daily egg counts and assessments. These mostly field-based studies have yielded valuable insights into the queen's biology, life history, and the effects of stressors, but new laboratory-based methods that facilitate a higher degree of experimental control would speed the progress of queen health research.

Within a colony, young adult "nurse" worker bees consume hive stored pollen, aka "bee bread," to develop their hypopharyngeal glands (HPGs). These glands produce the proteinaceous secretions that nurse bees use to provision members of the hive including developing larvae and the queen. Bee bread is made by mixing pollen, honey, and honey bee salivary secretions that contain bacteria commonly found in the honey bee digestive track. Cage studies have shown that while honey bees can survive and develop their HPGs and other tissues when fed artificial sources of protein, consuming bee bread results in the most developed HPGs.

The relationship between HPG development and retinue behavior is not well established, but it is known that queens are typically provisioned by bees less than 12 days old. Bees in this age range typically have highly developed HPGs, and we hypothesize that a relationship exists between queen care and HPG development. Similarly, while there is no established correlation between retinue behavior and egg laying, a correlation between queen feedings and egg laying has been documented, and diet quality has been shown to influence reproduction in honey bee and ant colonies. We therefore hypothesized that HPG development and egg laying using the Queen Monitoring Cage System QMCSQMCS disclosed herein can be manipulated through worker pollen feeding, and that feeding caged bees bee bread will result in higher egg laying and HPG development relative to commercially sourced pollen.

There is a pressing need to develop systems to examine and quantify the effects of single and multiple stressors on honey bee health. Queen egg laying is affected by a variety of seasonal, nutritional and social factors, and research suggests it may be vulnerable to disruption via these stressors.

Other systems, methods, features and advantages will be, or will become, apparent to one with skill in the art upon examination of the figures and detailed description. It is intended that all such additional systems, methods, features and advantages be included within this description, be within the scope of the disclosure.

BRIEF DESCRIPTION OF THE DRAWINGS

The features, objects and advantages in addition to those set forth above will become more readily apparent with reference to the following drawings and description. The components in the drawings are not necessarily to scale, emphasis instead being placed upon illustrating the principles of the invention. Moreover, in the figures, like referenced numerals designate corresponding parts throughout the different views. Such description makes reference to the following drawings, wherein:

FIGS. 5a and 5b and 5c are graphs depicting experimental results of the effect of three pollen diets on egg laying and pollen diet consumption.

FIGS. 6a and 6b are graphs depicting experimental results of the effect of two pollen diets on egg laying and pollen diet consumption.

Figure 1:
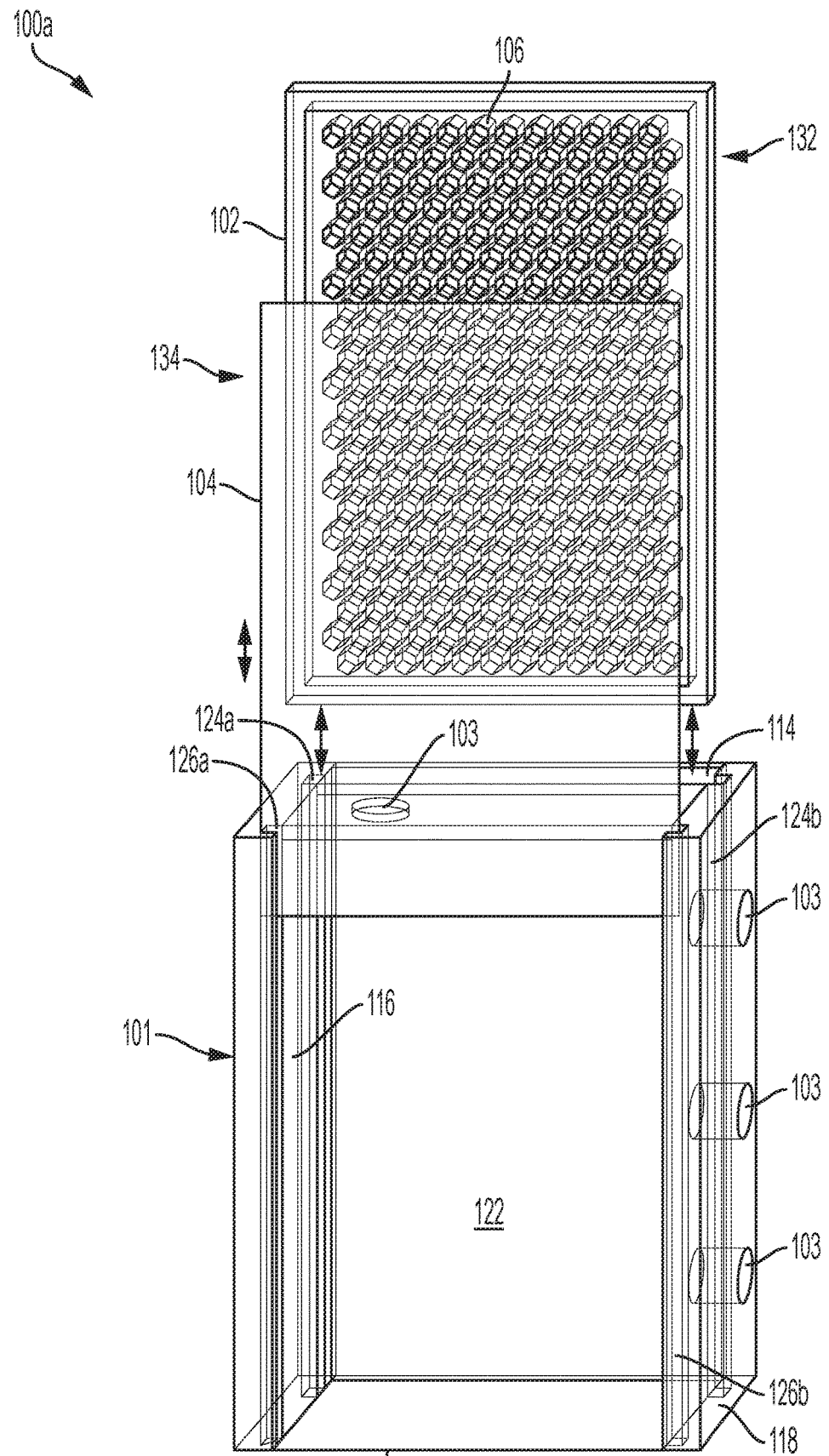
FIG. 1 is an example of a Style 1 embodiment of a Queen Monitoring Cage System (QMCS).

While the present disclosure is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments above and claims below for interpreting the scope of the invention.

DETAILED DESCRIPTION

The apparatus now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Likewise, many modifications and other embodiments of the apparatus described herein will come to mind to one of skill in the art to which the invention pertains having the benefit of the teachings presented in the descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

By way of introduction, the present disclosure provides a novel cage design and new method to track and quantify queen egg laying under controlled laboratory conditions. The queen monitoring cage system (QMCS) may be used in experiments to test the effect of pollen diet on egg laying. The use of the QMCS allows examination of the relationship between worker diet and physiology and queen fecundity, yielding robust data from a large sample size. During experiments using the QMCS, the number of eggs laid did not reach the high end for queens in full sized colonies reported in the literature, suggesting that further manipulations can increase egg production in this system. However, the majority of queens readily laid eggs in QMCS, and responses to diet treatments were observed, showing that the system is also suitable for risk assessment experiments. Visual observation of the activity of the honeybees is an important aspect of tracking queen egg laying. Accordingly, in embodiments the material from which the QMCS may be transparent or translucent. As such, in the illustrated examples of FIGS. 1-21, the materials are illustrated as transparent or translucent.

FIG. 1 is an example of a Style 1 embodiment of a Queen Monitoring Cage System (QMCS) 100a. The QMCS 100a includes a housing 101, an egg laying plate 102 and a lid 104. The housing 101 includes a top member 114, a first side member 116, a second side member 118 and a bottom member 120 defining a cavity 122 configured to receive and contain a plurality of honey bees. The top wall 114 may be proximate an upper end of the opposing walls 114 and 116 and the base wall 120 may be proximate an opposite end of the opposing walls 114 and 116. In an example configuration, the housing 101 is generally rectangular such that the top wall 114 and base wall 120 extend transversely with respect to the opposing walls 114 and 116, the egg laying plate 102 and the lid 104.

The egg laying plate 102 may be removably engaged with the opposing walls 116 and 118 and may serve as rear wall of the housing 101. The egg laying plate 102 may include a plurality of hexagonal cells 106 extending into the cavity. A lid 104 may be engaged with the opposing walls 116 and 118 and may serve as a front wall of the housing 101 to define the cavity 122. The lid 104 may be positioned in the housing 101 opposite the egg laying plate 102, and spaced away from the hexagonal cells 106 a predetermined distance to allow passage of honey bees therebetween.

The opposing walls 116 and 118 may include slots extending vertically between the base wall 120 and the top wall 114 of the housing 101. The egg laying plate 102 may be slidably positioned in a first pair of slots 124a and 124b by edges 132 of the egg laying plate 102 extending into opposing channels formed by the first pair of slots 124a and 124b. The lid 104 may be slidably positioned in a second pair of slots 126a and 126b by edges 134 of the lid 104 extending into opposing channels formed by the second pair of slots 126a and 126b. In the illustrated example of FIG. 1, the egg laying plate 102 and the lid 104 engage channels in the respective slots 124 and 126 on opposing sides of the top wall 114 and slide vertically in and out of the housing 101. When fully inserted, the egg laying plate 102 and the lid 104 may abut a planar surface of the base wall 120 and may extend on opposite sides of the top wall 114 to extend above the top wall. In other examples, the respective slots 124 and 126 may be horizontal, or angled such that the egg laying plate 102 and the lid 104 engage channels and are slidable horizontally or at an angle into and out of the cavity 122 and corresponding engage the top wall 114 and the bottom wall 120.

Figure 2:
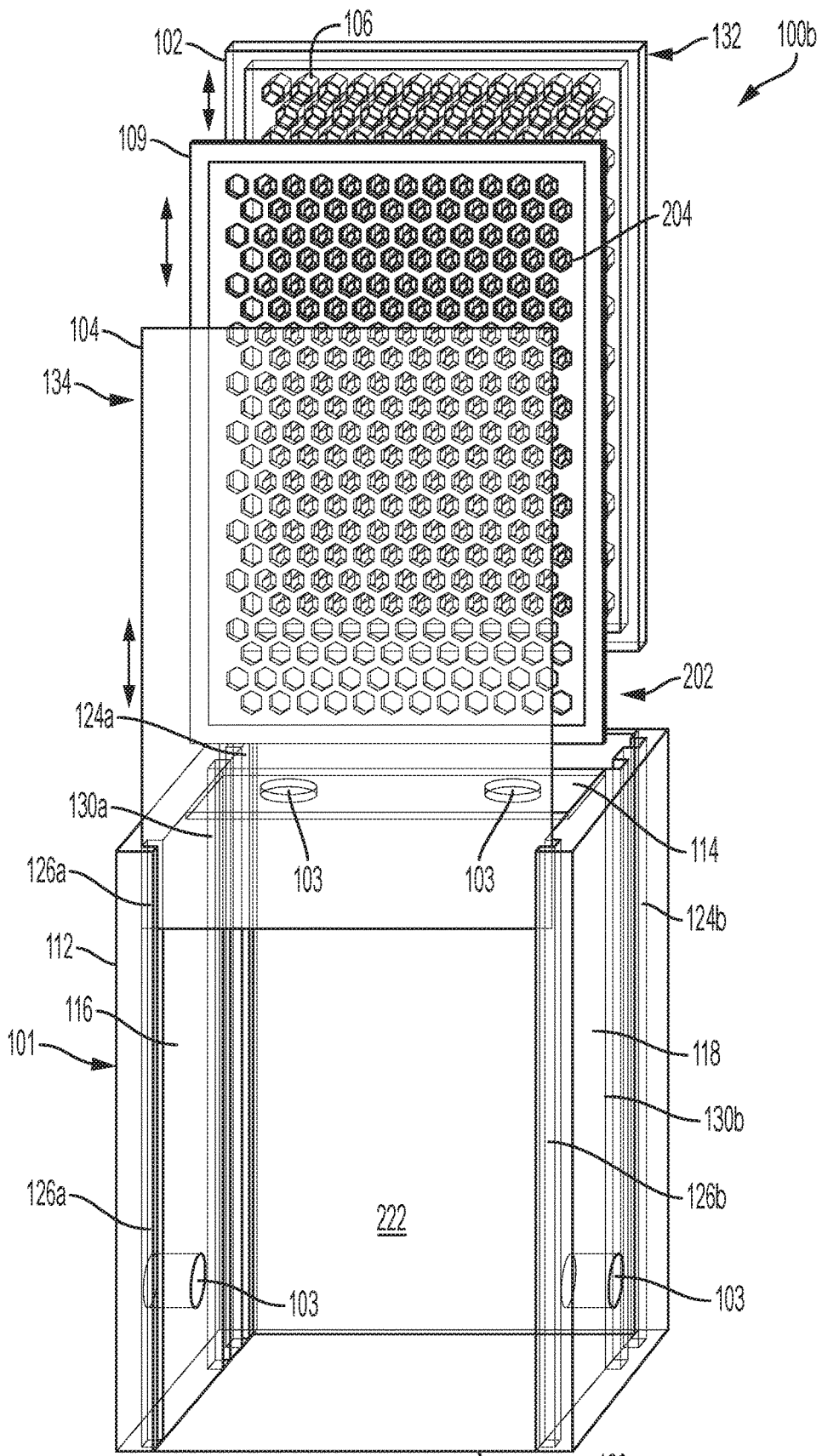
FIG. 2 is an example of a Style 2 embodiment of a Queen Monitoring Cage System (QMCS).

FIG. 2 is an example of a Style 2 embodiment of a Queen Monitoring Cage System (QMCS) 100b. Similar to the example of FIG. 1, the QMCS 100b includes a housing 101, an egg laying plate 102 and a lid 104. In addition, the QMCS 100b includes an adaptor 109 with edges 202 engaged with slots 130a and 130b in the opposing walls 114 and 116. Unless otherwise indicated, the features and functionality of the Style 1 QMSC 100a discussed with reference to FIG. 1 are similar. Accordingly, for purposes of brevity the details of these features and functionality will not be fully repeated, and it should be understood that features and functionality are fully interchangeable, combinable, and/or useable in the example QMSC embodiments described herein.

The adaptor 109 includes a plurality of hexagonal apertures 204 that are sized and positioned on the adaptor 109 to align with the plurality of hexagonal cells 106 included in the egg laying plate 102. When fully inserted into the housing 101, each of the hexagonal cells 204 in the adaptor 109 are contiguously aligned with an entrance of each of hexagonal cells 106 in the egg laying plate 102. Thus, the adaptor 109 slightly increases the overall depth of each hexagonal cells 106. Since the adaptor 109 and the egg laying plate 102 are contiguously aligned, the honeybees are not significantly affected by the crack or transition between the entrance to the hexagonal cell 106 and the adaptor 109.

The adaptor 109 is positioned above the entrance to each hexagonal cell 106 to provide honey bees in the QMCS 100b with continuity when an egg laying plate 102 is removed from the housing 101 and replaced with a new egg laying plate 102. Continuity is provided since the adaptor 109 is not removed and replaced. Accordingly, any residual pheromone, wax and/or propolis on the adaptor 109 remains undisturbed when the egg laying plate 102 is removed. Thus, even though a new egg laying plate 102 is inserted, the honeybees recognize and accept the new egg laying plate 102 due to the adaptor 109 being contiguously aligned. Moreover, due to the contiguous contact and close alignment, the queen bee will deposit eggs through the adaptor 109 into the hexagonal cells 106 included in egg laying plate 102.

The egg laying plate 102 may be removed while maintaining the adaptor 109 in position in a cavity 222. In order to maintain the honeybees in cavity 222 when the egg laying plate 102 is removed, an insert (not shown) may be slidably inserted into the slots 130a and 130b to be positioned as a partition between the egg laying plate 102 and the adaptor 109 in order to temporarily isolate the egg laying plate 102 from the queen bee and the honeybees. The insert may be a flexible, yet rigid material, such as a plastic film that has a relatively small thickness to fit into the slots 130a and 130b with the adaptor 109. The adaptor 109 may be used to maintain familiarity of the queen bee and the worker bees, such as nurse bees, to minimize disruption and/or trauma among the queen bee and the worker bees as the egg laying plate(s) are removed and replaced. Once the new egg laying plate 102 is fully inserted into the grooves 124a and 124b, the insert may be slidably removed to allow the queen bee and the worker bees to again have access to the hexagonal cells 106 in the new egg laying plate 102. Since the hexagonal cells 106 of the adaptor 109 are contiguously aligned with the entrance to the hexagonal cells 106 of the new egg laying plate 102, disruption or other non-productive behavior by the honeybees is minimized. Also, since the queen bee and the honeybees cannot discern a significant change to the hexagonal comb structure due to the static and unchanged adaptor 109, the queen bee can immediately begin laying more eggs in the new egg laying plate 102.

An insert may also be used as a partition in the Style 1 QCMS 100a illustrated in FIG. 1. With the Style 1 QCMS 100a, the queen bee and honey bees can be segregated from the cavity 122 by first installing the insert between the egg laying plate 102 and the cavity 122. Since the egg laying plate 102 may be a wall of the housing 101, once introduced, the insert may temporarily act as a wall of the housing 101 until the egg laying plate 102 is re-installed.

Figure 3:
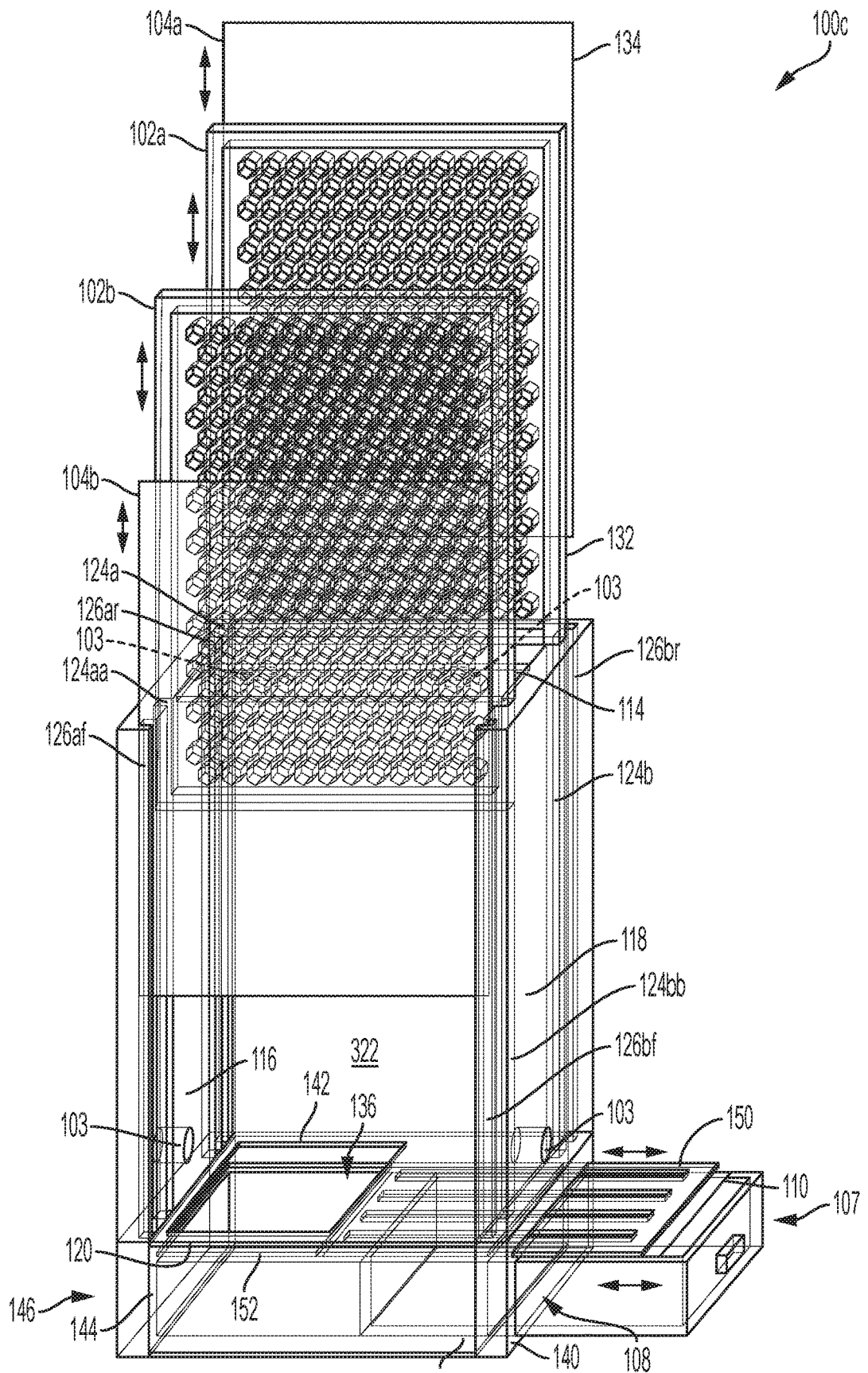
FIG. 3 is an example of a Style 3 embodiment of a Queen Monitoring Cage System (QMCS).

FIG. 3 is an example of a Style 3 embodiment of a Queen Monitoring Cage System (QMCS) 100c. The system 100c may include a housing 101 in which a first egg laying plate 102a and a second egg laying plate 102b are removeably inserted into a cavity 322 using respective slots 124a and 124b and 124aa and 124bb. Respective rear lid 104a and front lid 104b may be positioned opposite the respective first and second egg laying plates 102a and 102b in respective rear slots 126ar and 126br and front slots 126af and 126bf. When fully inserted, the first and second egg laying plates 102a and 102b may abut the base wall 120, and be contiguously aligned with opposite edges of the top wall 114. A predetermined space may be created between the first and second egg laying plates 102a and 102b and the respective rear lid 104a and the front lid 104b. Unless otherwise indicated, the features and functionality of the Style 1 and Style 2 QMSC 100a and 100b discussed with reference to FIGS. 1 and 2 are similar. Accordingly, for purposes of brevity the details of these features and functionality will not be fully repeated, and it should be understood that features and functionality are fully interchangeable, combinable, and/or useable in the example QMSC embodiments described herein.

The Style 3 QMCS 100c may also include a removable drawer 107. The drawer 107 may be slidably and removably positioned in the housing 101 to allow the introduction and removal of honey bees. The housing 101 may be formed to include a slot 108 proximate the base wall 120, and dimensioned to receive the drawer 107. In this example configuration, the base wall 120 include an aperture 136 to allow the introduction of honeybees into the cavity 322 or removal of honeybees from the cavity 322 via the drawer 107. In an example configuration a queen excluder 150 may be slidably inserted in slots 152 in the housing 101 to restrain the queen bee from entering the drawer 107 via the aperture 136. In addition, an insert 110 may be slidably inserted in slots 152 to close off the queen excluder 150 and/or access into the cavity 322 from the drawer 107 via the aperture 136. The housing 101 may also include a front face 140 in which the slot 108 is formed, a bottom wall 140, opposing drawer sidewalls 142 in which the slots 152 are formed, and a drawer back wall 144, which form a drawer enclosure 146. The drawer 107 is slidably positioned in the housing 101 such that honey bees may remain in the drawer 107 until movement through the aperture 136 between the drawer 107 and the cavity 322 is available. In examples, the drawer 107 and the drawer sidewalls 144 and back wall 146 may be removeably coupled with the housing 101 such that these items can be removed from the housing 101 when not in use. The Style 3 QMCS 100c may also include adaptors 109 (FIG. 2) by including additional slots in the opposing sidewalls 116 and 118 of the housing 101.

With reference to FIGS. 1-3, the three styles of QMCS 100a, 100b, and 100c may be separately and independently used or may be mixed to perform queen monitoring. Each of Style 1, Style 2 and Style 3 may include apertures 103, which are illustrated in these examples as being the top wall 114, and side walls 116 and 118. The apertures 103 provide ports through which feeding tubes containing materials may be inserted. The feeding tubes may containing the materials may be inserted into the cavity 122, 222, 322 to sustain the honeybees. The feeding tubes may include small apertures so the honeybees can access the materials in the feeding tubes. The materials inserted into the cavity 122, 222, 322, may be honey, water, sucrose solution, pollen or some combination thereof.

During queen monitoring experiments, all of the Styles 1, 2 and 3 were used and found to be comparable. Styles 1, 2 and 3 100a, 100b, and 100c are all resilient to multiple uses, and the larger dimensions of Style 3 101c facilitated worker bee subsampling by allowing larger worker populations to be used in the housing 101. Consideration when performing investigations of queen monitoring using this system may involve the need to determine the trade-offs between the economies of smaller worker populations and the needs of experiments with subsampling protocols.

Figures 4A, 4B:
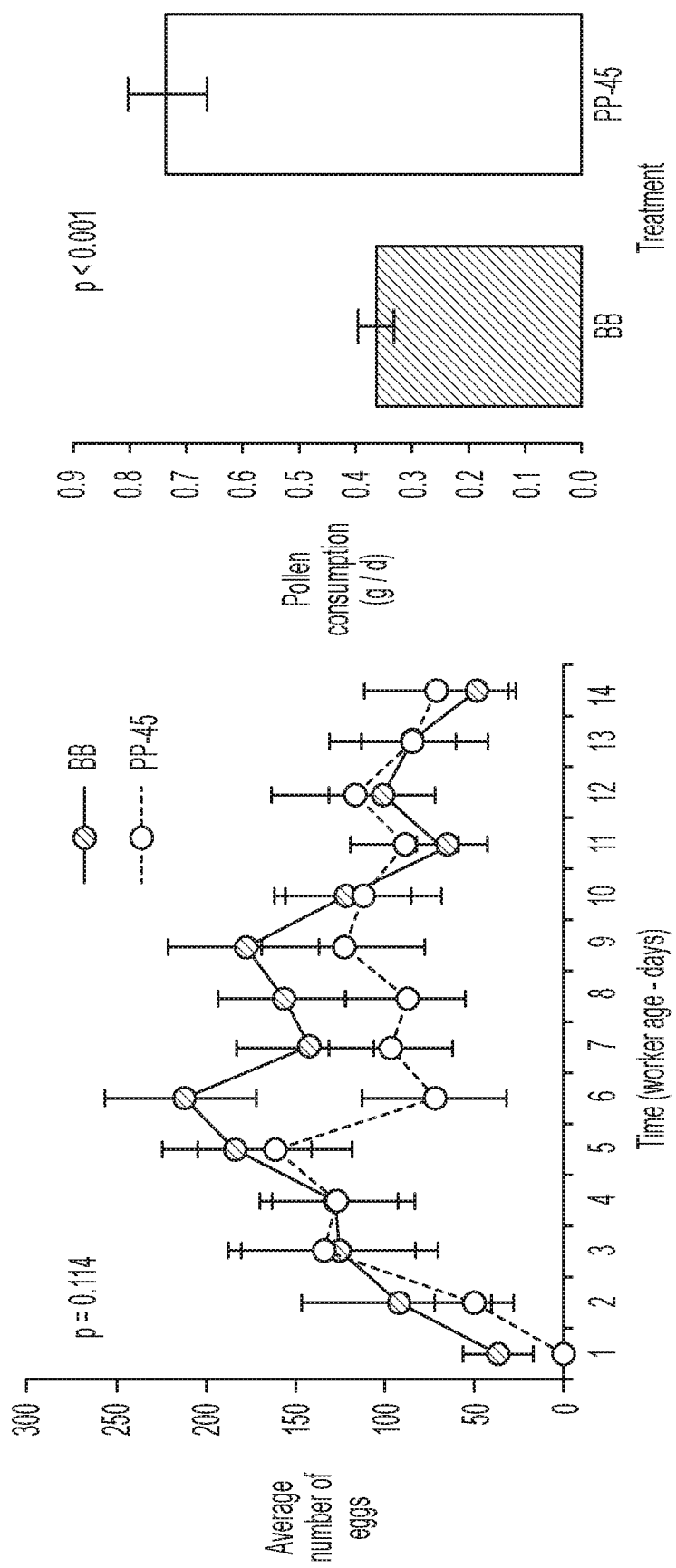
FIGS. 4a and 4b are graphs depicting experimental results of the effect of two pollen diets on egg laying and pollen diet consumption.

FIGS. 4a and 4b are graphs depicting experimental results of the effect of two different pollen diets on egg laying and pollen diet consumption. In FIGS. 4a and 4b, Experiment 1, the effect of pollen diets on egg laying and pollen diet consumption are illustrated as follows: FIG. 4a shows average±SE number of eggs laid per day in QMCS provisioned with bee bread (BB) or 45% pollen paste (PP-45). The p-value is the result of GEE analysis (see methods). FIG. 4b illustrates Average±SE pollen diet consumed per day in BB and PP-45 treatment groups. The p-value is the result of a Wilcoxon Rank Sum test.

FIGS. 5a and 5b and 5c are graphs depicting experimental results of the effect of three pollen diets on egg laying and pollen diet consumption. In FIGS. 5a-5c, Experiment 2, the effect of pollen diets on egg laying, pollen diet consumption and hypopharyngeal gland acinus diameter are illustrated. FIG. 5a illustrates average±SE number of eggs laid per day in QMCS provisioned with bee bread (BB); frozen bee bread (FBB) or with 45% pollen paste (PP-45). The p-value is the result of GEE analysis. FIG. 5b illustrates average±SE pollen diet consumed per day in BB; FBB; and PP-45 treatment groups. The p-value is the result of a Kruskal Wallis test. FIG. 5c depicts the average±SE acini diameter of worker bees sampled on day 7 and 8 from QMCS provisioned with BB, FBB, and PP-45. The p-value is the result of a Kruskal Wallis test.

FIGS. 6a and 6b are graphs depicting experimental results of the effect of two pollen diets on egg laying and pollen diet consumption. In FIG. 6a, Experiment 3, the effect of heavy pollen paste diet on egg laying and pollen diet consumption is illustrated. As depicted. average±SE number of eggs laid in QMCS provisioned with bee bread (BB) or with 70% pollen paste (PP, orange). The p-value is the result of GEE analysis. In FIG. 6b, average±SE pollen diet consumption per day in BB and PP-70 treatment groups are illustrated. The p-value is the result of Wilcoxon Rank Sum test.

The results depicted in FIGS. 5a and 5b and 5c of Experiment 2 and FIGS. 6a and 6b of Experiment 3 indicate that provisioning QMCS with bee bread relative to pollen can positively influence queen egg laying. This difference was particularly striking in Experiment 2, when provisioning QMCS with frozen bee bread resulted in nearly 3 times more eggs than 45% pollen paste. This may be due in part to the differences in pollen composition of the diets. Percentages of pollen in bee bread as high as 88% have been reported, and, as the primary source of protein, lipids, and many vitamins and minerals for honey bees, pollen is essential to the health of a colony. The relatively higher consumption of pollen paste in Experiment 2 may have been a compensatory response to the lower percentage of pollen relative to the other diets. This is consistent with the finding that when the percentage of pollen in pollen paste was increased to 70%, a much smaller disparity in the eggs laid between bee bread and pollen paste-provisioned QMCS was observed.

Bee bread was also shown to positively affect the size of worker bee hypopharyngeal glands (HPGs), suggesting a mechanism for the effect of worker nutrition on queen egg laying. Within a colony, the queen receives her nutrition through trophallaxis with young worker bees who form a retinue around her. Although a direct relationship between HPG development and queen retinue behaviors has not been established, the results of Experiment 2 strongly suggest that worker HPG development influences queen egg laying productivity. This may be directly related to the ability of worker bees to provision the queen with proteinaceous secretions produced by the HPGs. In other insect species it is well known that reproduction is heavily dependent on individual nutrition, but in these experiments, the pollen diet was not directly consumed by the queen. These results suggest that the egg laying of the honey bee queen is dependent on worker nutrition, demonstrating one mechanism by which the colony functions as a superorganism.

Average HPG acinus diameter in bees from QMCS provisioned with bee bread was still smaller than what has been reported in the literature for similarly aged bees. Perhaps this is because at the time the bees were sampled, egg laying had not yet peaked, and worker HPG development also had not yet peaked. An alternative explanation is that because QMCS were populated only with younger bees, some bees may have experienced accelerated development resulting in more forager-like physiology, with smaller HPGs. This phenomenon is based on social inhibition of adult maturation and has been previously reported in single-cohort colonies initially composed of all young worker bees.

Although there were no differences in egg laying between queens in QMCS provisioned with bee bread or frozen bee bread, workers from QMCS provisioned with frozen bee bread had higher average HPG gland sizes. This may be because freezing plant material degrades the cell wall components, potentially making pollen easier to digest. Our results demonstrate that freezing bee bread at −80° C. is an acceptable form of short term storage and may even contribute to successful egg laying in QMCS. The duration and conditions of pollen storage are known to affect its quality and suitability for brood rearing, therefore more work is needed to determine if bee bread can be stored in this manner for longer periods of time. Additionally, more work is needed to determine what components of bee bread contribute positively to egg laying.

In all three experiments, egg laying rates were low initially and increased over the first few days. This indicates that worker age has an effect on queen egg laying in QMCS. This is not surprising, as worker honey bees exhibit striking patterns of physiological and behavioral maturation, a function of the colony's age-related division of labor. This also has been observed in laboratory cages, and was likely the cause of the patterns observed here. This also likely explains the strong time by treatment interaction effects on queen egg laying seen in all three experiments. Additionally, the possibility that seasonal variation in bee bread composition affected these results must also be considered. A recent study by Degrandi-Hoffman et al. found that honey bee gene expression profiles vary with time of year and the seasonality of their pollen diet, suggesting that bees in QMCS can also be manipulated this way in the future.

Another variable worth considering in the future is the effect of worker honey bee genetic variation. Genetic variation among workers has been shown to affect virtually every trait studied, at the molecular, physiological, and behavioral levels, so it is possible that there also is variation for physiological and behavioral traits that affect queen egg laying.

The results presented here demonstrate the sensitivity of a laboratory QMC system for detecting these effects. In the future, the system may be used for experiments to assess the single and combined effects of pesticides, pathogens, parasites and nutrition on egg laying. Paired with extant and additional field study data, the findings of experiments performed with QMCS could greatly aid in predicting, assessing, and mitigating health risks to the honey bee population and pollination services.

Figure 7:
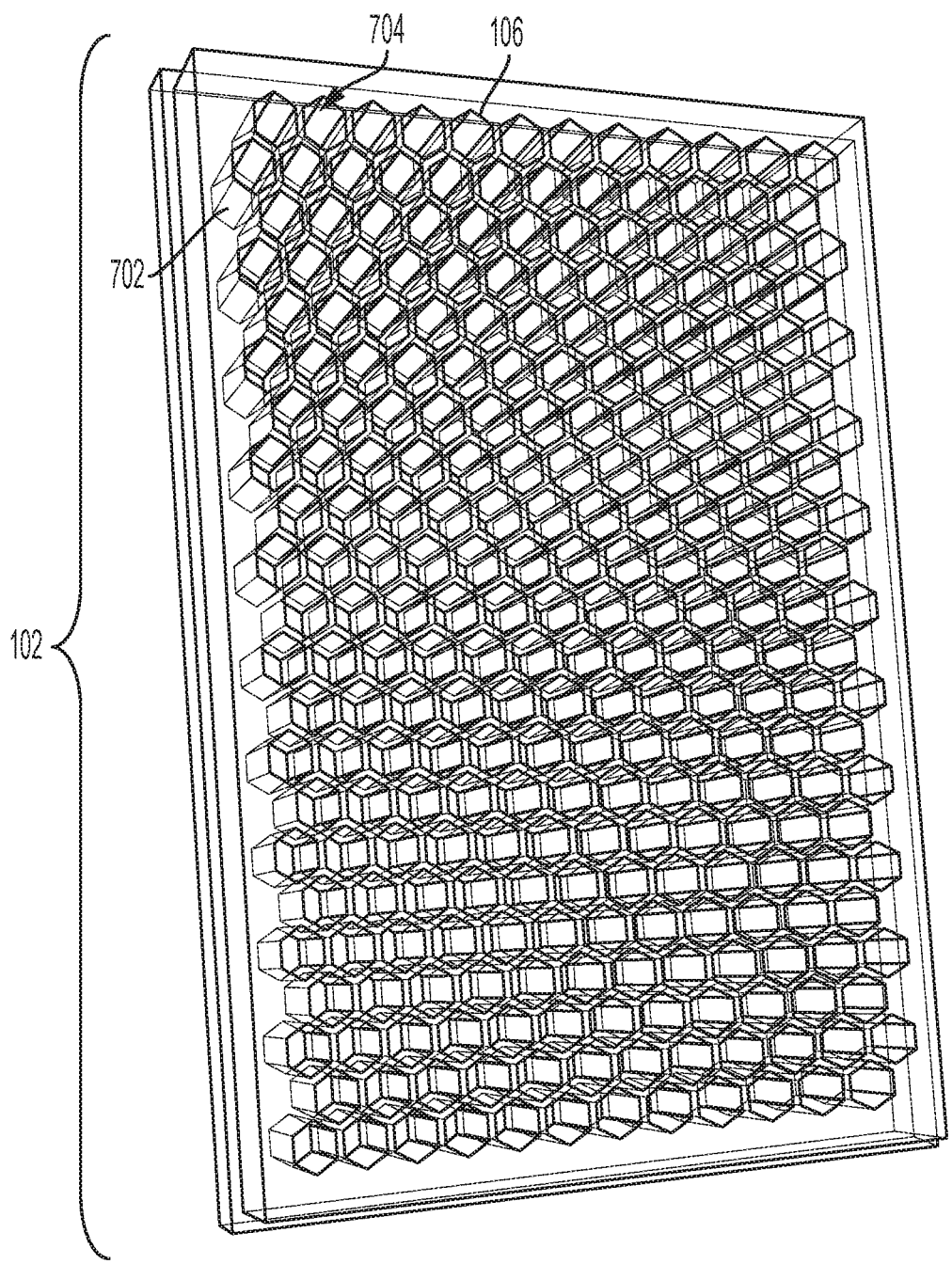
FIG. 7 is a perspective view of an example egg laying plate included in the QMCS.

FIG. 7 is a perspective view of an example egg laying plate 102 included in the QMCS. In an example, the egg laying plate 102 may have dimensions of 5.1 cm by 1.1 cm deep for hexagonal cells 106, which are the optimal size in which queen bees will lay eggs. The hexagonal cells 106 form a repeating predetermined pattern with each cell 106 having a bottom 702. The bottom 702 of the cells 106 may form a wall in the housing 101 in which the egg laying plate 102 is inserted. The egg laying plate 102 may be positioned in the housing such that the cells 106 extend away from the bottom into the cavity 122, 222, 322 to form an entrance 704 to each of the cells 106. The honeybees in the QMCS 100a, 100b and 100c may access the entrances 704, and the queen bee may deposit eggs in the bottom 702. The egg may be cared for and fed by the nurse bees, and may develop into a larval stage. The entrance 704 may then be sealed by the nurse bees with wax so that the larvae can proceed through the pupa stage and emerge from the cells 106 as adult honeybees.

Egg laying plates 102 made of polystyrene was an exemplary material in which the queens would lay eggs in the cells 106. The translucency of polystyrene was useful in monitoring the cells 106 in which eggs were laid and to monitor pupae/larvae. The egg laying plates 102 may be made of any other material that was conducive to queen laying.

Figure 8:
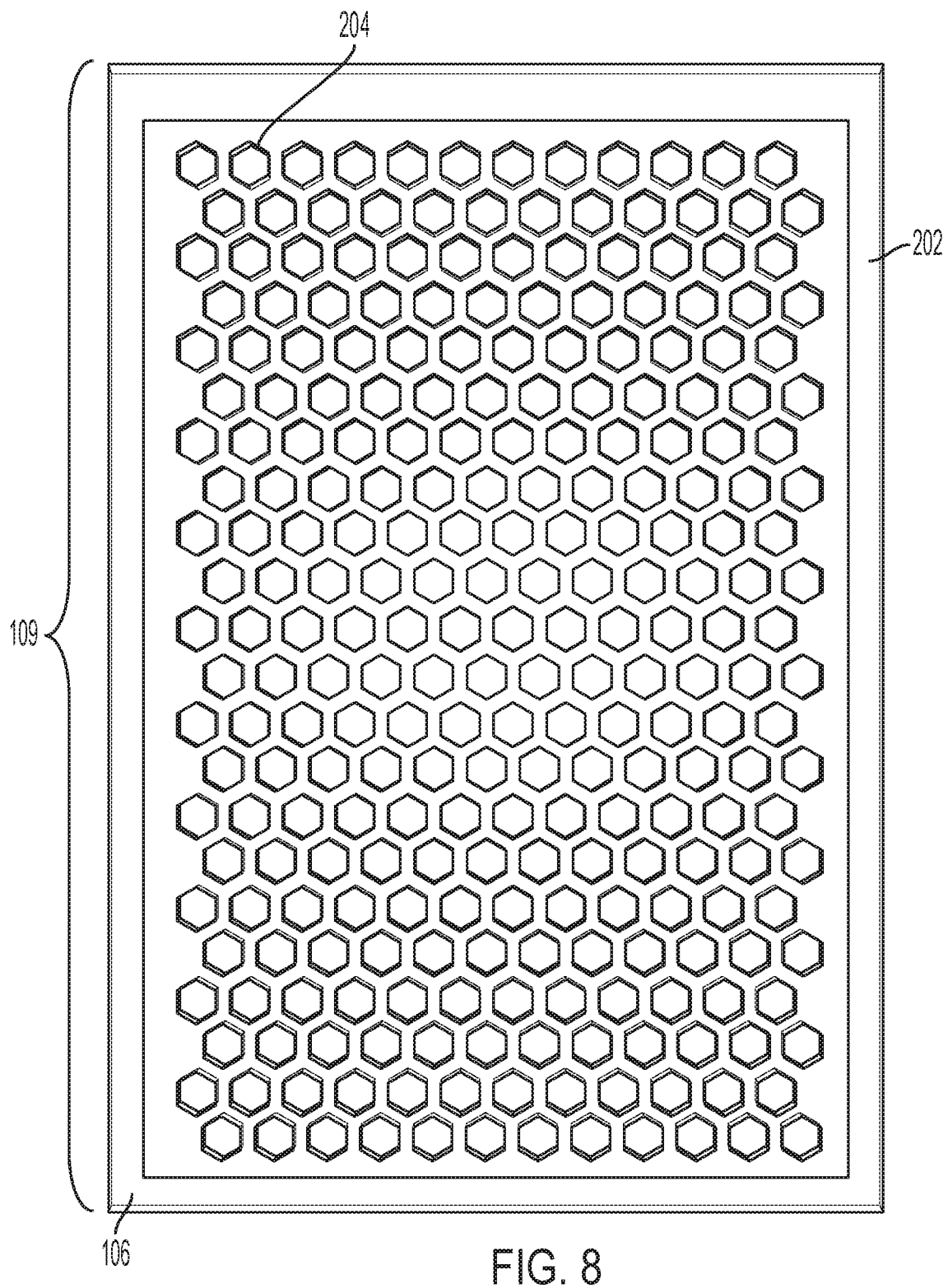
FIG. 8 is a front view of an example adaptor which may be included in embodiments of the QMCS.

FIG. 8 is a front view of an example adaptor 109, which may be included in embodiments of the QMCS 100a, 100b, 100c. The adaptor 109 may include apertures 204 formed in a hexagonal pattern to match the pattern of the egg laying plate 102. FIG. 8 shows an example adaptor 109 that can be inserted adjacent to the egg laying plate 102. The adaptor 109 can have a hexagonal pattern of apertures 204 sketched onto the surface, which match the hexagaonal pattern of the cells 106 of the egg laying plate 102. The adaptor 109 can have edges or flanges 202 that allow the adaptor 109 to be inserted and removed from the queen monitoring cage system 100a, 100b, 100c. The system 100a, 100b, 100c can be designed so that the egg laying plates 102, inserts and adaptors 109 can be added from the side as well as from the top.

Figure 9:
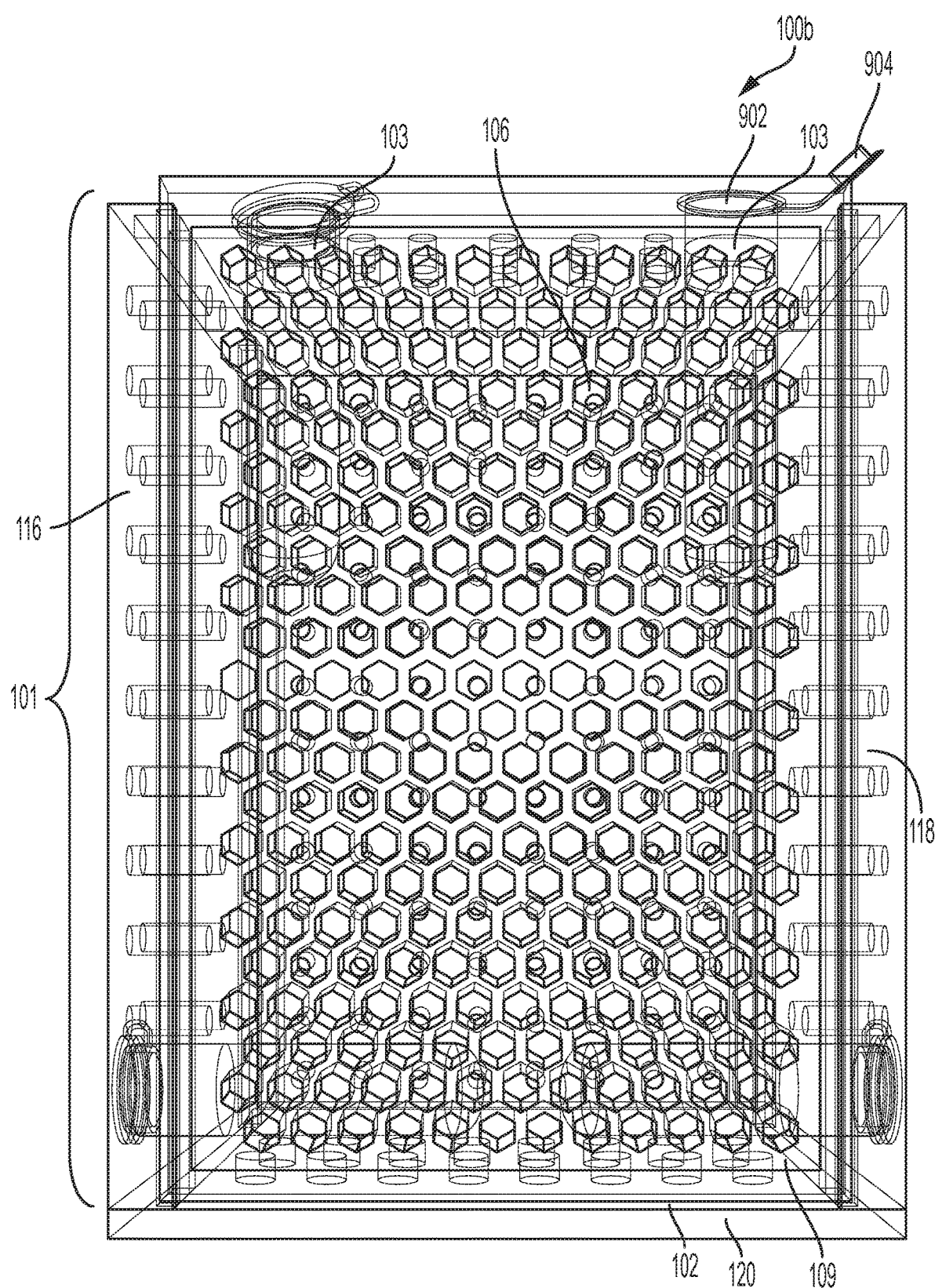
FIG. 9 is a rear view of an example of the Style 2 embodiment of the QMCS illustrated in FIG. 2.

FIG. 9 is a rear view of an example of the Style 2 embodiment of the QMCS illustrated in FIG. 2. FIG. 9 shows a rear view of one embodiment of the queen monitoring cage system (Style 2) 100b, having an egg laying plate 102 and an adaptor 109 inserted into the housing 101. The housing 101 has one or more ports 103 that allows for introduction of materials (e.g. honey, water, sucrose solution, pollen) into the housing 101 without allowing bees within the housing 101 to escape. The ports 103 may receive feeding tubes 902, which may be securely inserted by friction fit in the ports 103. The feeding tubes 902 may include lids 904 to maintain materials in the feeding tubes 902 when the feeding tubes 902 are inserted horizontally into ports 103 in the sidewalls 116 and 118, or through ports 103 in the bottom wall 120.

Figure 10:
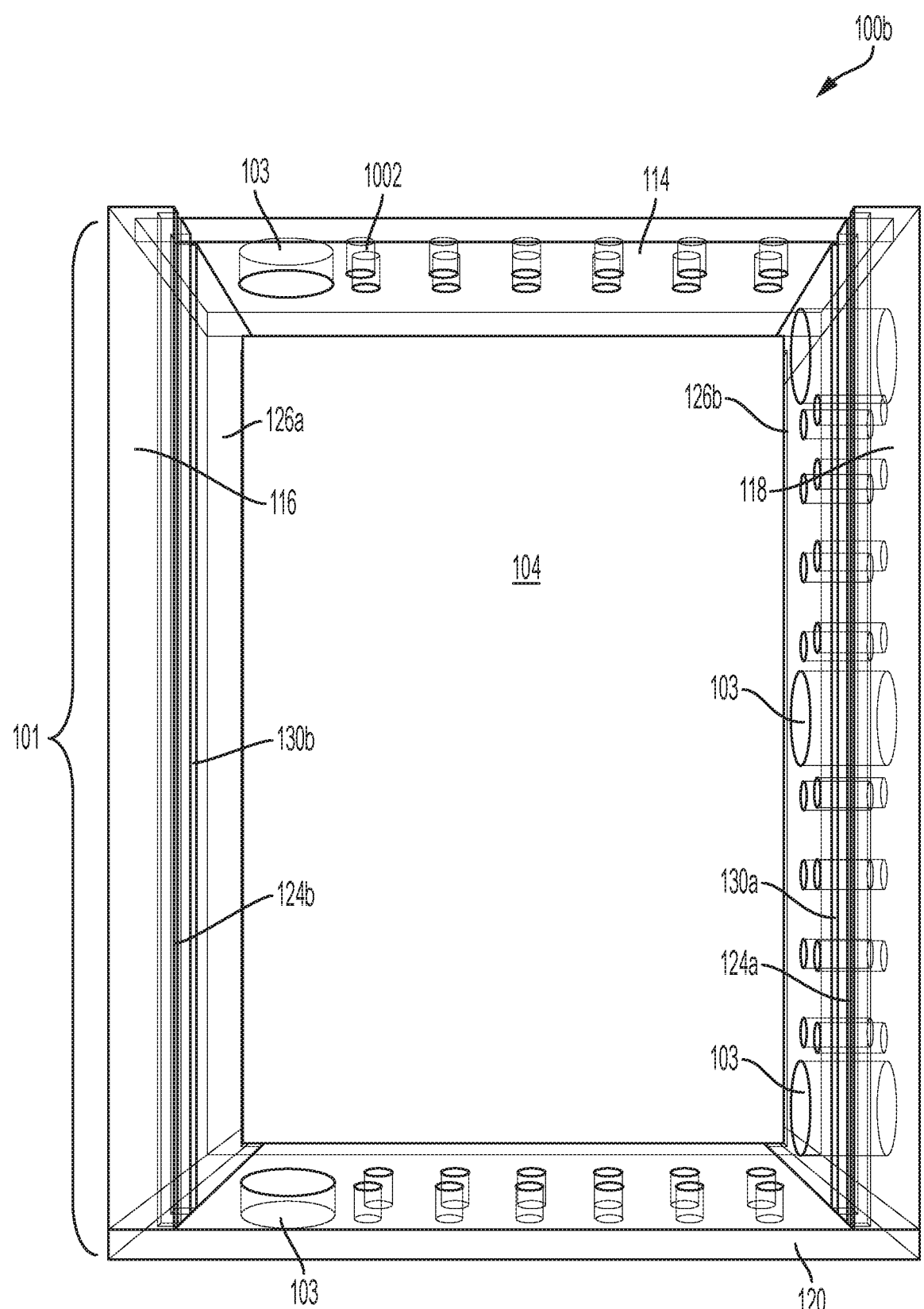
FIG. 10 is rear view of an example housing that may be included in the Style 2 embodiment of the QMCS illustrated in FIG. 2.

FIG. 10 is rear view of an example housing 101 that may be included in the Style 2 embodiment of the QMCS illustrated in FIG. 2. FIG. 10 shows a rear view of a housing 101 with the egg laying plate 102, the adaptor 109 and feeding tubes 902 removed and the lid 104 inserted in the slots 126a and 126b. The illustrated housing 101 of this embodiment shows multiple ports 103 and a plurality of small holes 1002 in the top wall 114, the opposing side walls 116 and 118, and the bottom wall 120. The holes 1002 may be located throughout the housing 101 to allow for air flow through the housing 101 without allowing bees inside the housing 101 to escape. FIG. 10 also illustrates the slots 124a and 124b for receipt of the egg laying plate 102, and slots 130a and 130b for receipt of the adaptor 109. FIG. 10 also depicts the relative position of the slots 126a and 126b for the lid 104, the slots 130a and 130b for the adaptor 109, and the slots 124a and 124b for the egg lay plate 102. An insert, such as a relatively thin flexible piece of plastic may also be slidably inserted into slots 130a and 130b with the adaptor 109 between the adaptor 109 and the egg laying plate 109. The insert allows for insertion and removal of the egg laying plate 102 without allowing bees in the housing 101 to escape by isolating the honeybees from the egg laying plate 109. Alternatively, the insert may be slidably inserted into the slots 124a and 124b with the egg laying plate 102 to provide isolation and minimize escapes.

Figure 11:
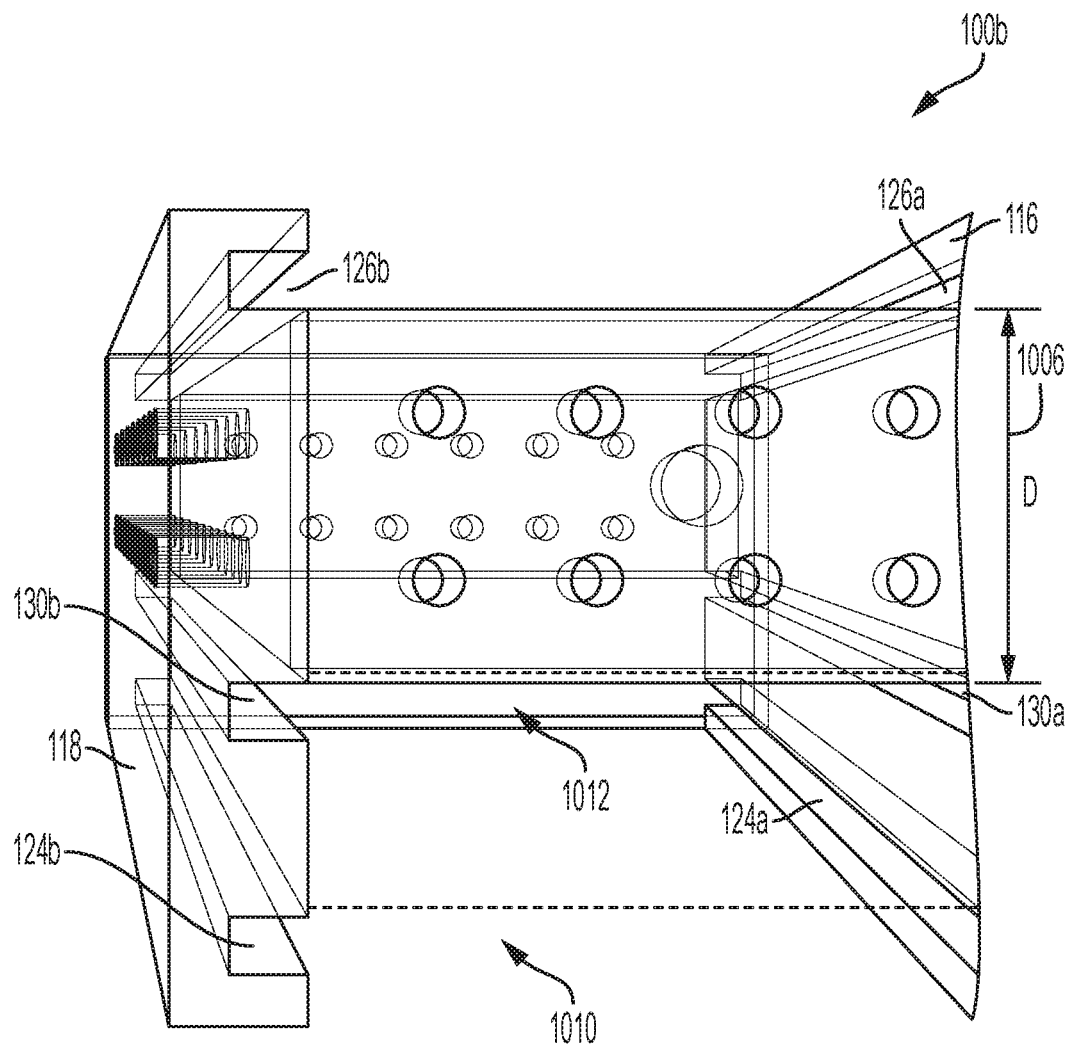
FIG. 11 is a bottom partial view of an example of the housing illustrated in FIG. 10.

FIG. 11 is a bottom partial view of an example of the housing illustrated in FIG. 10. FIG. 11 illustrates the relative positioning in the housing 101 of the slots 126a and 126b for the lid 104, the slots 130a and 130b for the adaptor 109, and the slots 124a and 124b for the egg laying plate 102. As also illustrated in FIG. 11 with reference to FIG. 7, a predetermined distance (D) 1006 is established between the location of the entrances 704 of the hexagonal cells 106 included in the egg laying plate 102 and the lid 104 by the slot locations. As discussed elsewhere, the predetermined distance (D) 1006 is referred to as a bee space to accommodate passage of honeybees between the egg laying plate 102 and the lid 104. The bottom 702 of the hexagonal cells 106 may lie in a plane illustrated by dotted line 1010 as extending from the slot 124a to slot 124b, whereas the entrances 704 and the adaptor 109 may lie in a plane illustrated as dotted line 1012 extending between the opposing walls 116 and 118 and slots 130a and 130b. The distance between the planes 1010 and 1012 may represent the depth of the hexagonal cells 106 in the egg laying plate 102 and the thickness of the adaptor 109. Both the bottom 702 of the hexagonal cells 106 and the lid 104 may provide opposing removeable walls in the housing 101 with the honeybees disposed therebetween.

The location of the slots 130a and 130b provide positioning of the adaptor 109 proximate the entrances 704 of the hexagonal cells 106 such that first the adapter and then the entrances 704 may be presented to the honeybees. In an example, the adaptor 109, once inserted into the slots 130a and 130b may be in contiguous contact with the entrances 704 of the hexagonal cells 106. An insert, in the form of a flexible material such as plastic, may be slideably inserted into the slots 130a and 130b to separate the adaptor 109 from the entrances 704 to the hexagonal cells 106 and isolate the hexagonal cells 106 from the honeybees. This allows removal and replacement of the egg laying plate 102 without escape of the honeybees or the queen bee.

Figure 12:
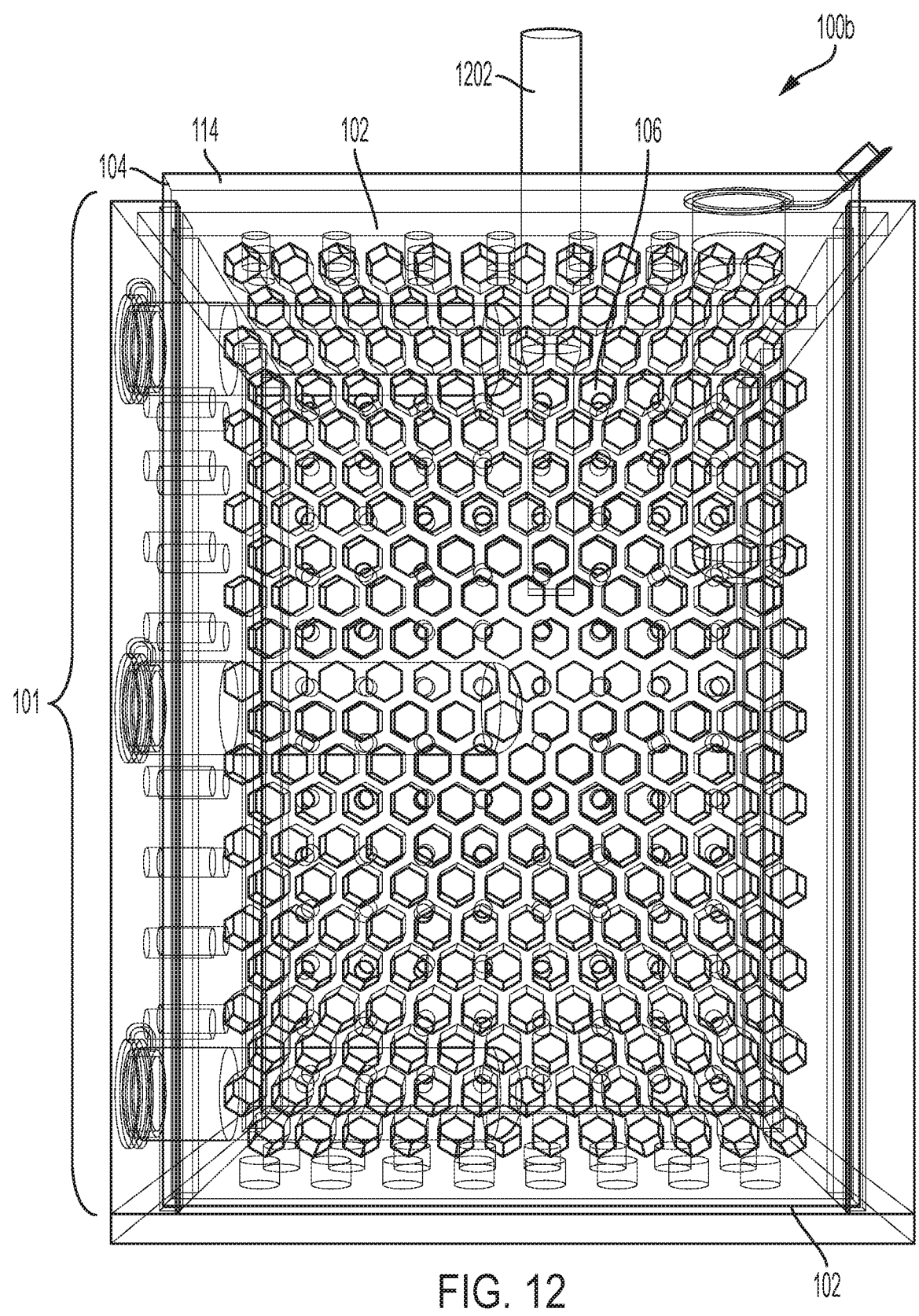
FIG. 12 is a rear view of an example of the Style 2 embodiment of the QMCS illustrated in FIG. 10 without an adaptor.

FIG. 12 is a rear view of an example of the Style 2 embodiment of the QMCS 100b illustrated in FIG. 9 with the adaptor 109 removed. In FIG. 12, with reference to FIGS. 7 and 11, a lid 104 is positioned near the slots 124a and 124b proximate the base 702 behind the egg laying plate 102. In FIG. 12, Style 2 of the QMCS 100b is depicted with the egg laying plate 102 inserted into the housing 101. The egg laying plate 102 is inserted into the slots 124a and 124b and the lid 104 is placed outside the slots 124a and 124b behind the egg laying plate 102 and between the opposing walls 116 and 118. The slots 130a and 130b are empty since no adaptor 109 is present. A wedge 1202 is depicted as inserted between the egg laying plate 102 and the lid 104 to move the egg laying plate 102 into the location of the slots 130a and 130b so the honeybees do not escape through the opening that would otherwise be created by the absence of the adaptor 109 in the slots 130a and 130b.

Figure 13:
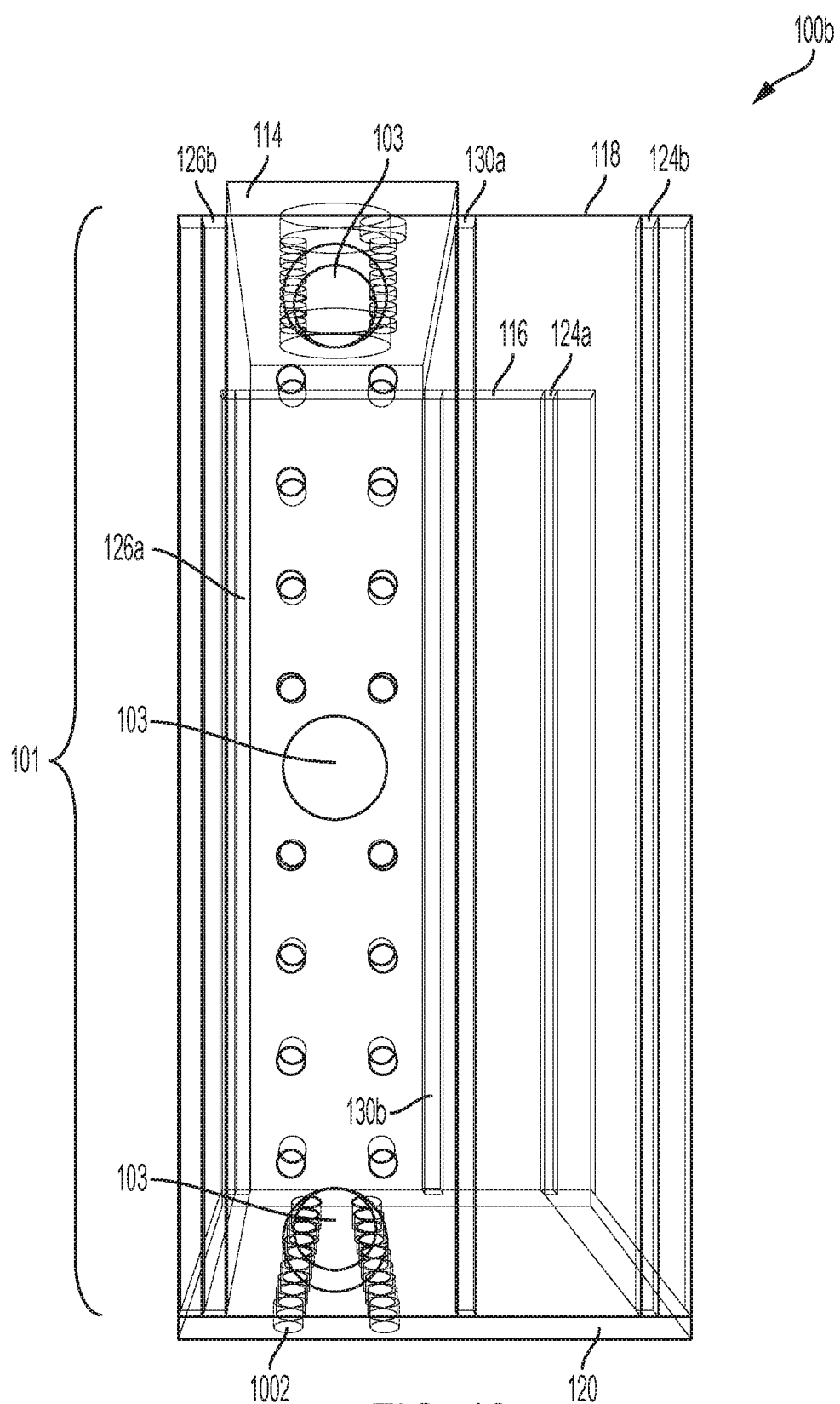
FIG. 13 is a side view of an example of a housing that may be included in the Style 2 embodiment of the QMCS illustrated in FIG. 10.

FIG. 13 is a side view of an example of a housing 101 that may be included in the Style 2 embodiment of the QMCS 100b illustrated in FIG. 10. In FIG. 13, the housing 101 is illustrated as an empty cage with the egg laying plate 102, the lid 104 and the adaptor 109 removed. The housing 101 includes several ports 103 and a plurality of small holes 1002 for ventilation, including holes 1002 in the bottom wall 120. The opposing side wall 116 and 118 are illustrated as positioned transverse to the top wall 114 and the bottom wall 120. In addition, the opposing walls 116 and 118 extend past the slots 124a and 124b that receive the egg laying plate 102 so that the lid 104 may be accommodated in that location, in addition to the lid 104 present in the slots 126a and 126b. In addition, the opposing walls 116 and 188 extend past the slots 126a and 126b that receive the lid 104.

Figure 14:
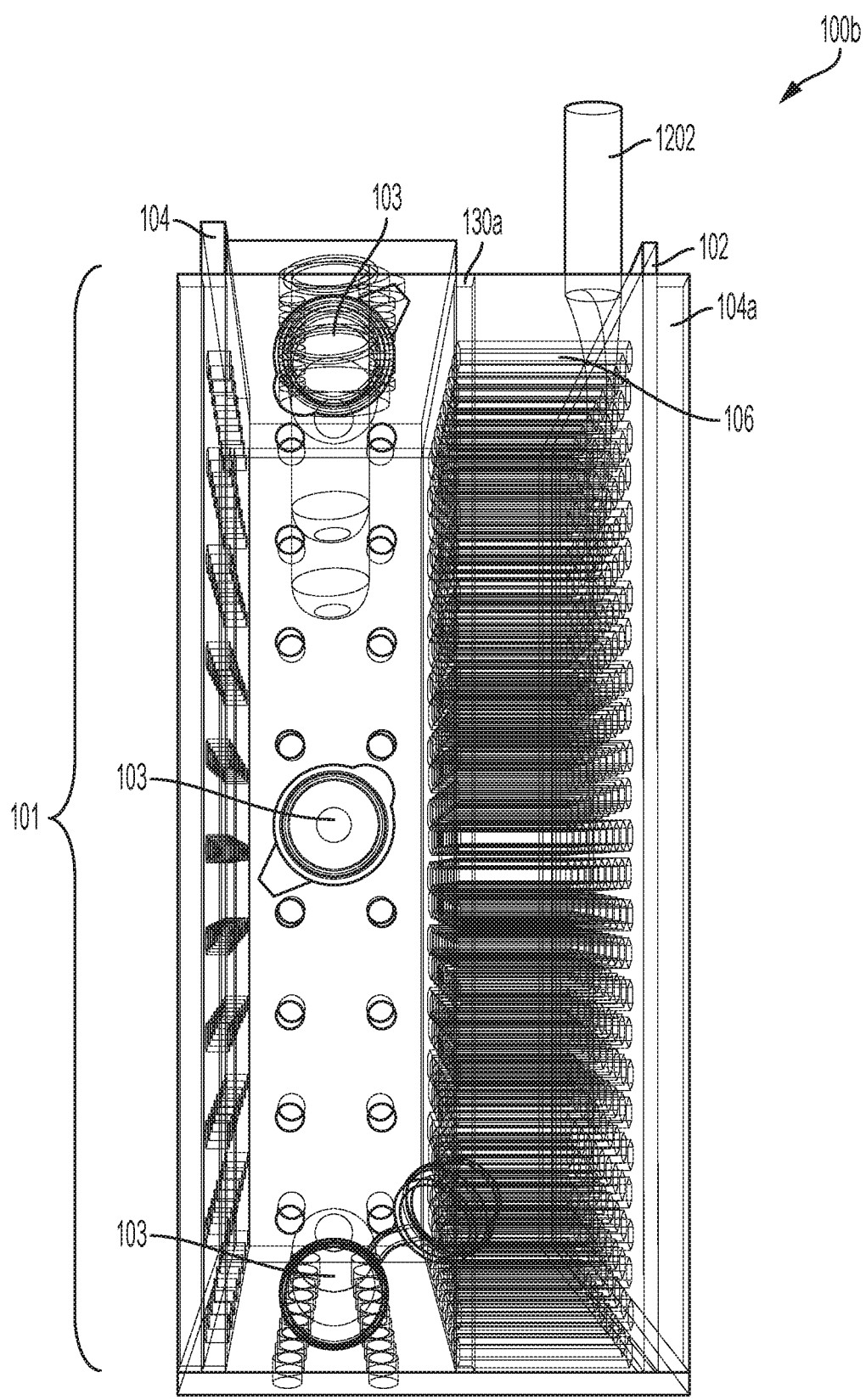
FIG. 14 is a side view of an example of the Style 2 embodiment of the QMCS illustrated in FIG. 12.

FIG. 14 is a side view of an example of the Style 2 embodiment of the QMCS illustrated in FIG. 13. In FIG. 14 with reference to FIGS. 7 and 11, the egg laying plate 102 is inserted in slots 124a and 124b and the lid 104 is inserted in slots 126a and 126b. In addition, a lid 104a is positioned between the opposing walls 116 and 118, and is held in place by friction fit. The wedge 1202 is inserted between the bases 702 of the egg laying plate 102 and the lid 104a in order to bias the egg laying plate 102 forward into the cavity 122, 222, 322. In this way, the entrances 704 of the hexagonal cells 106 are biased toward the cavity 122, 222, 322 into a plane located between the slots 130a and 130b to effectively close off a possible escape route for honeybees in the cavity 122, 222, 322. Not only is the predetermined space D maintained by this biasing, but also the hexagonal cells 106 close off a potential escape route of the honeybees through the empty space between the slots 130a and 130b.

Figure 15:
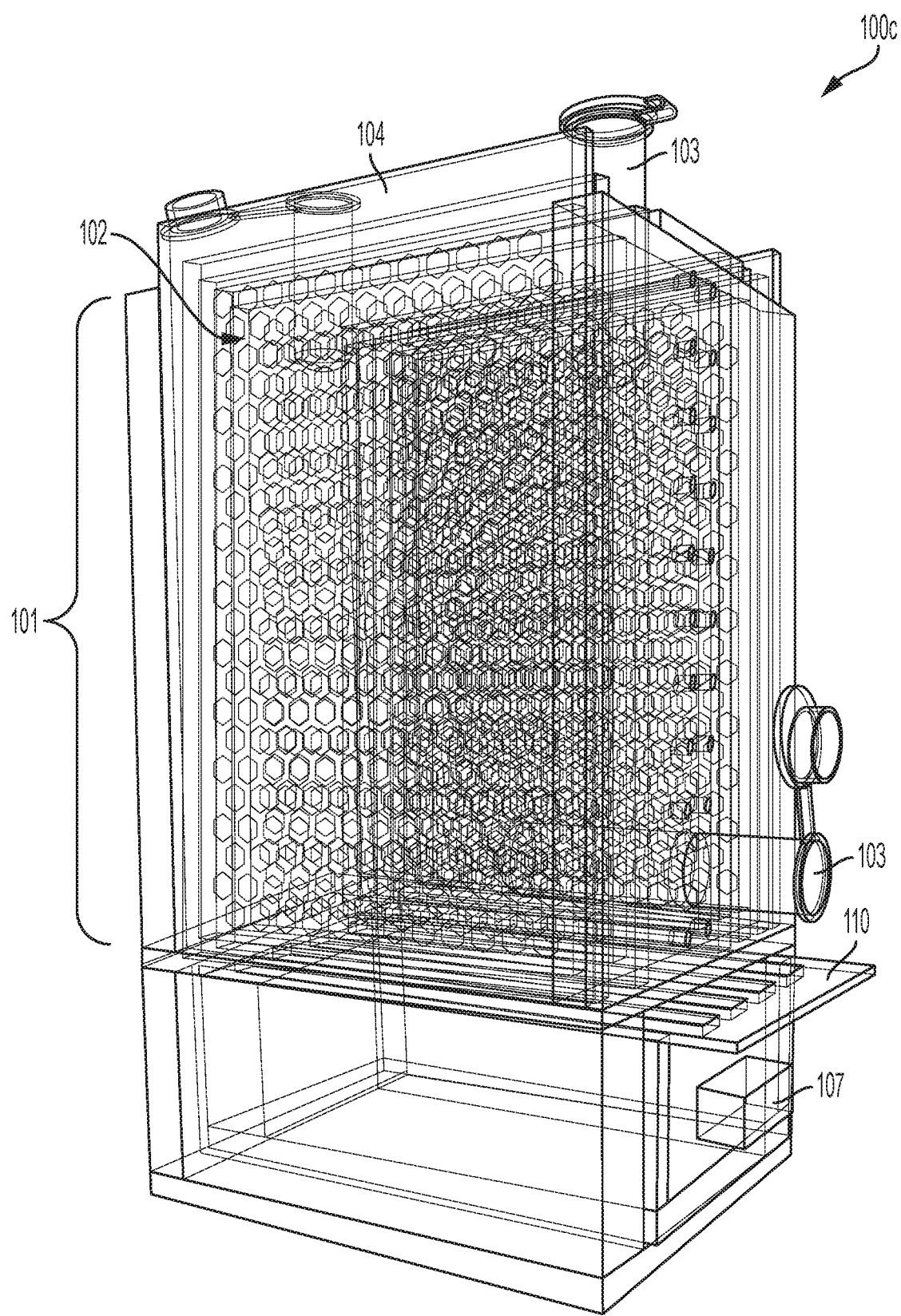
FIG. 15 is a perspective view of an example of the Style 3 embodiment of a Queen Monitoring Cage System (QMCS) illustrated in FIG. 3.

FIG. 15 is a perspective view of an example of the Style 3 embodiment of a Queen Monitoring Cage System (QMCS) 100c illustrated in FIG. 3. In FIG. 15, a removable drawer 107 is included for the introduction and removal of bees into the cage, without disturbing the egg laying plates 102 and allowing other bees already in the cage to escape. A drawer insert 110 can be placed adjacent to the drawer 107 so bees can be introduced into the drawer 107 and the drawer insert 110 prevents other bees from entering the drawer 107 and escaping while additional bees are added. Bees can be added to the drawer 107, the drawer closed, and the drawer insert 110 removed to allow the bees in the drawer to enter the cavity 322. This design can prevent the escape of bees already in the housing 101. Although in this embodiment the drawer is positioned on the bottom, the drawer 107 may be positioned in other places. Note that the previously discussed features and functionality of QMCS 100a and 100b is fully applicable to QMCSc, and will not be repeated for sake of brevity.

Figure 16:
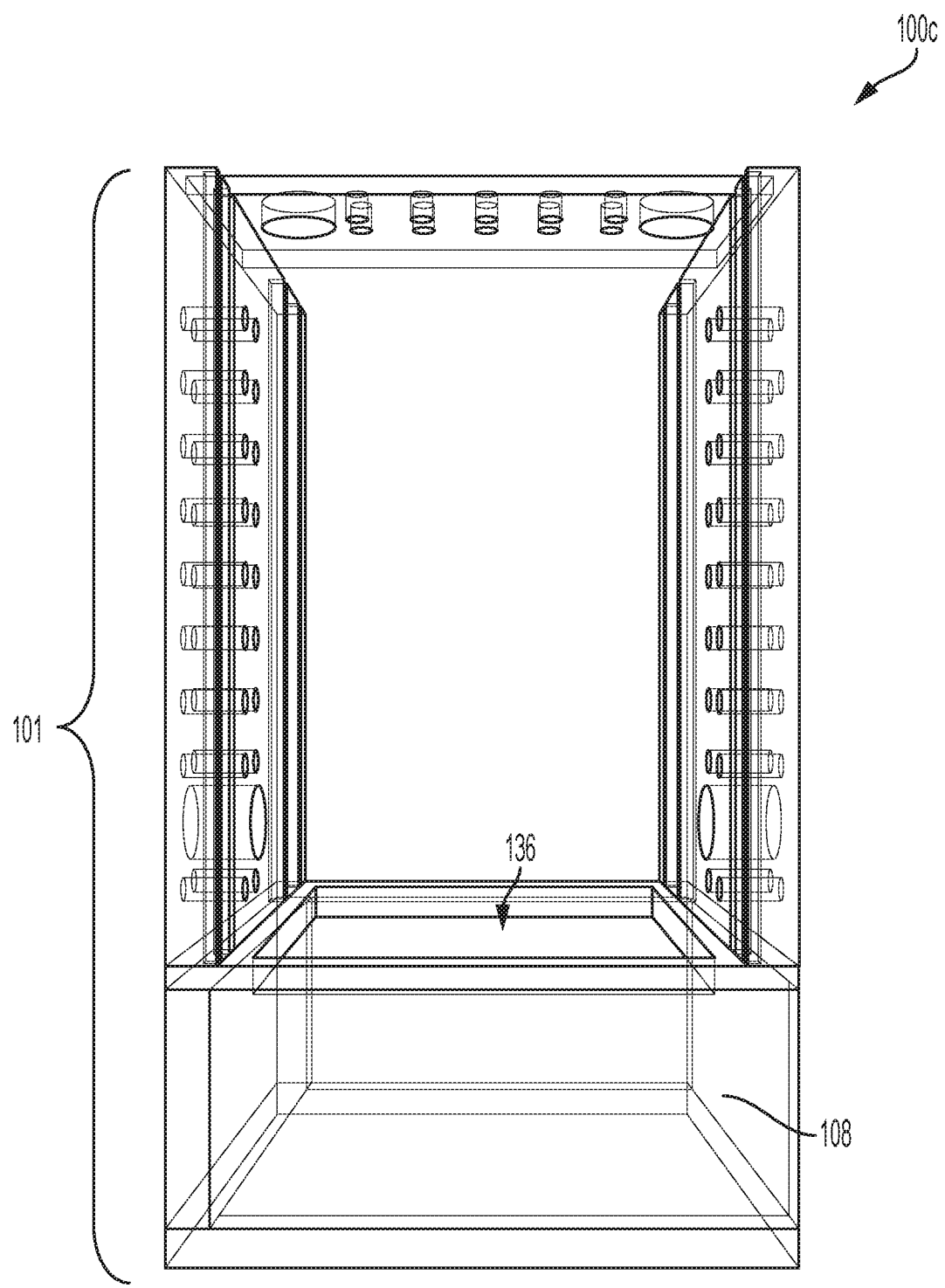
FIG. 16 is a front view of an example housing that may be included in the Style 3 embodiment of the QMCS illustrated in FIG. 15.

FIG. 16 is a front view of an example housing that may be included in the Style 3 embodiment of the QMCS 100c illustrated in FIG. 15. In FIG. 16, an empty housing 101 of style 3 is depicted, showing an empty slot 108 for insertion of a drawer 107. The base 120 may include the aperture 136. In the illustrated embodiment with reference to FIG. 3, slots (126ar, 126br, 126af and 126bf) for the lids 104a and 104b and slots (124ar, 124br, 124af and 124bf) for the egg laying plates 102a and 102b are illustrated. In other examples, slots for adaptors 109 may also be included.

Figure 17:
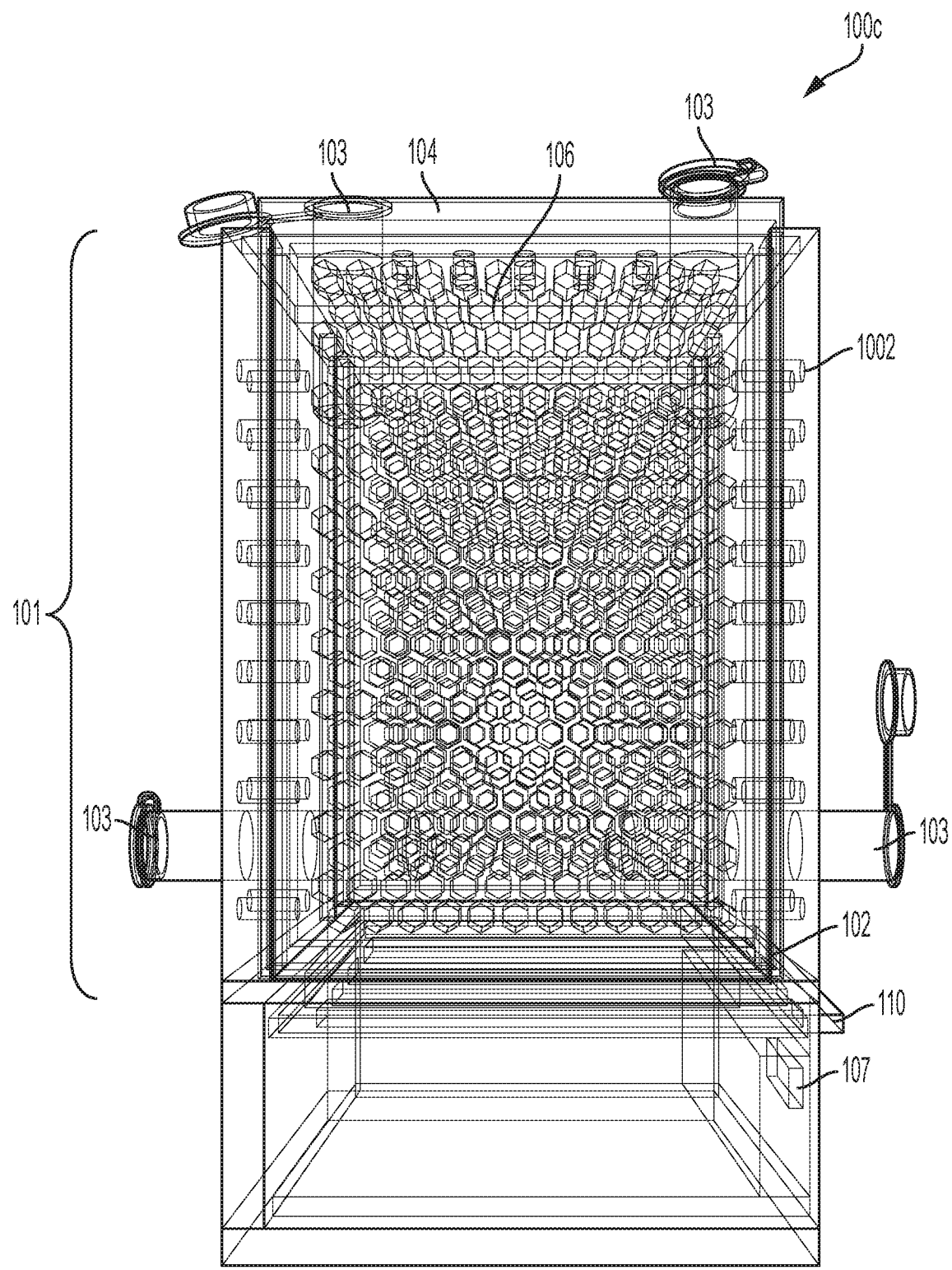
FIG. 17 is front view of an example housing that may be included in the Style 3 embodiment of the QMCS illustrated in FIG. 15.

FIG. 17 is front view of an example housing 101 that may be included in the Style 3 embodiment of the QMCS 100c illustrated in FIG. 15. The illustrated QMCS 100c includes an egg laying plate 102, a lid 104 and a drawer 107 inserted into the housing 101. Ports 103 and air holes 1002 may be strategically and advantageously positioned in the cavity 322 to nourish and ventilate the honeybees.

Figure 18:
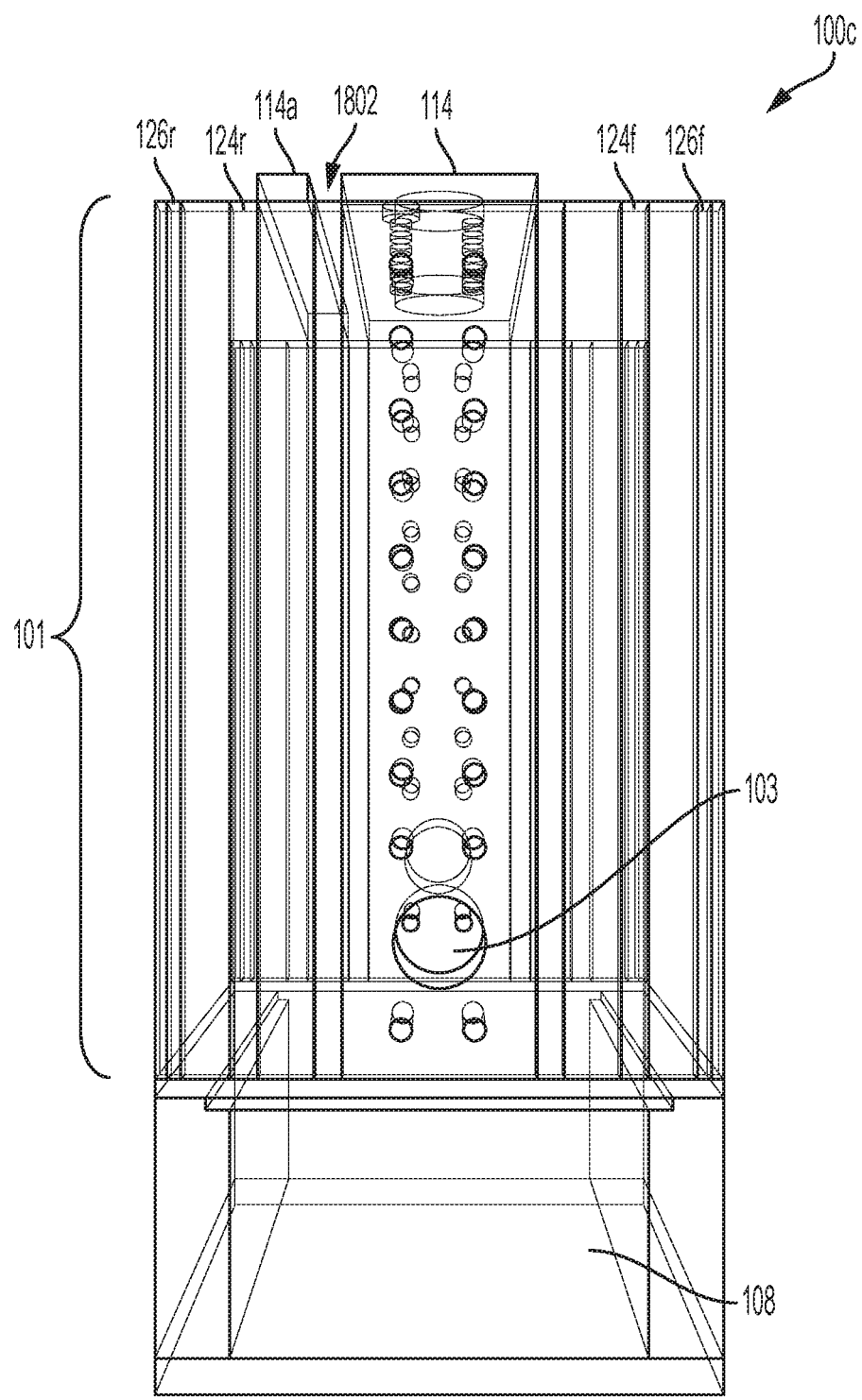
FIG. 18 is a side view of an example housing that may be included in the Style 3 embodiment of the QMCS illustrated in FIG. 15.

FIG. 18 is a side view of an example housing 101 that may be included in the Style 3 embodiment of the QMCS 100c illustrated in FIG. 15. An empty queen monitoring cage (style 3) is illustrated showing front and rear slots 126f and 126r for respective front and rear covers 104a and 104b, and front and rear slots 124f and 124r for respective front and rear egg laying plates 102a and 102b. The illustrated example embodiment also includes a top wall divided into a primary top wall 114 and secondary top wall 114 with an additional slot 1802 therebetween. The additional slot 1802 may, for example be used with another lid 104 to partition between the front egg laying plate 104a and the rear egg laying plate 104b. In other examples, slots and corresponding front and rear adaptors 109 may be included.

Figure 19:
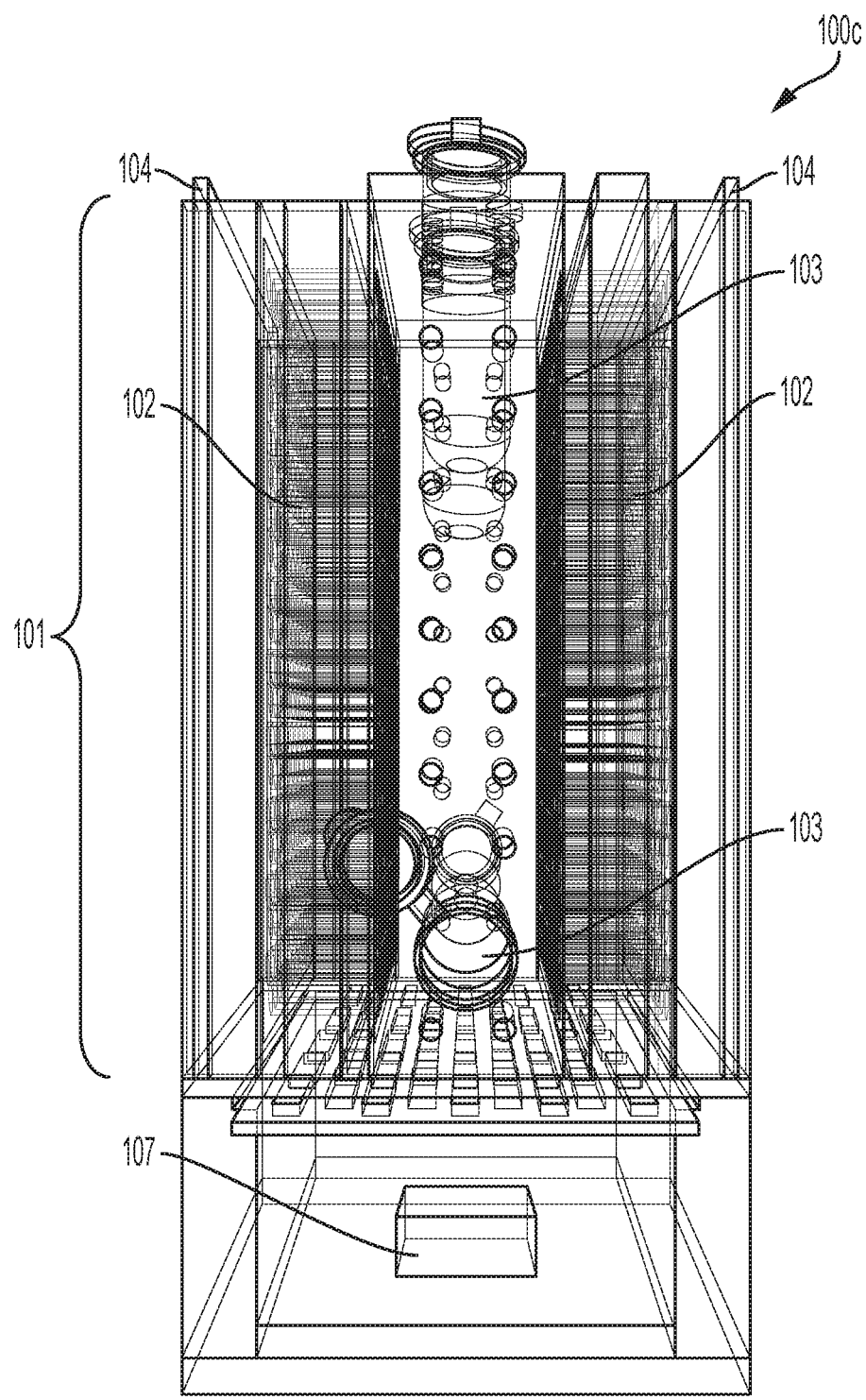
FIG. 19 is a side view of an example of the Style 3 embodiment of the QMCS illustrated in FIG. 15.

FIG. 19 is a side view of an example of the Style 3 embodiment of the QMCS 100c illustrated in FIG. 15. FIG. 19 depicts two egg laying plates 102a and 102b, two lids 104, and a drawer 107 inserted into the cage 101.

In some embodiments the materials that make up the cage, inserts, adaptors, and drawer, may be made of a translucent material, such as plexiglass. Plexiglass provides strength, durability and translucency. Other similar materials could also be used.

EXAMPLE EMBODIMENTS

The below examples are specific implementations and should not be construed as narrowing or limiting the scope and breadth provided by this disclosure.

Queen Monitoring Cage Systems

The QMCS were composed of a translucent material, such as plexiglass, with small holes in the walls for ventilation (FIGS. 1, 2 and 3, for example). Each QMCS contained 1-2 egg laying plates (ELP) positioned vertically and serving as the inner walls of the cages. These example egg laying plates were custom made injection-molded, polystyrene plates, which were patterned with 264 hexagonal wells or cells measuring 5.1 cm across and 1.1 cm deep, mimicking the dimensions of the cells in natural honey bee brood comb. We chose to develop a system that does not require beeswax substrates because most samples of beeswax indicate contamination with various agrochemical residues. New ELPs were used for each experiment. Each QMC has four ports through which feeders containing pollen, sucrose solution, water, and honey can be inserted. Three cage designs were used throughout this study to facilitate different experimental designs involving larger numbers of bees, and to explore how subtly different designs can facilitate the monitoring process.

Style 1 measured 8.3 cm×2.8 cm×12.3 cm (interior). A removable ELP is inserted into the back with a plexiglass insert behind it to block the bees from exiting the cage when the ELP is emptied or replaced. This QMC had four holes large enough to accommodate 2 ml feeders.

Style 2 was of the same dimensions as QMC Style 1, however, in place of a plexiglass insert, a plastic adaptor was placed between the interior of the cage and the ELP. The adaptor was a 3D printed (Viper SI, 3D Systems Inc., material: WaterClear Ultra 10122) outline of the 264 cells and provided an interface between the bees and the ELP. This allowed for the ELP to be easily removed without disturbing the bees. An insert in the form of a flexible plastic film inserted between the adaptor and the ELP was used to keep the bees from exiting the cage while the ELP was emptied or replaced. These adaptors tended to warp during cleaning, therefore care must be taken to ensure their continued utility.

Style 3 measured 8.3 cm×4.5 cm×12.3 cm (interior) with a removable drawer for the introduction and removal of workers. This QMC had four holes large enough to accommodate 5 ml feeders and incorporated two parallel ELPs that face each other. Plexiglass inserts were used to prevent bees from exiting the cage when ELPs were emptied or replaced.

Example 2. Effects of Bee Bread Vs 45% Pollen Paste on Egg Laying

Throughout our experiments, most queens in all treatment groups laid eggs in QMCS. See Table 1 for a summary of egg laying observed in the 3 experiments. All 3 cage styles performed well in these experiments, though Style 3 allowed for more bees to be used, facilitating the sampling of adult bees throughout experiments.

There was no significant difference in egg laying rates between CMCs provisioned with BB vs. PP-45 (p=0.114, GEE, Wald Chi-Square=2.5, df=1, FIG. 2). Egg laying rates changed over time, with a statistically significant effect of time on egg laying (p≤0.0001, GEE, Wald Chi-Square=1892.7, df=13). Egg laying on Day One was significantly lower than egg laying on the final day (Table 2). A significant interaction was detected between time and treatment (p≤0.0001, GEE, Wald Chi-Square=320.7, df=13). This interaction was only evident on Day 1, and the directionality indicated that the difference in egg laying on this day relative to Day 14 was smaller in QMCS provisioned with bee bread than PP-45 (Table 3).

Significantly greater amounts of pollen diet were consumed by bees in QMCS fed PP-45 relative to BB (p≤0.0001, Wilcoxon Rank Sum, Chi-Square=18.7, df=1, FIG. 2). A significant negative correlation was detected between time and pollen consumption (p≤0.0001, Spearman's ρ=−0.8).

Example 3. Effects of Fresh Bee Bread Vs. Frozen Bee Bread Vs. 45% Pollen Paste on Egg Laying A significant effect of diet type was observed (p=0.001, GEE, Wald Chi-Square=13.9, df=2), with queens in FBB and BB QMCS laying significantly more eggs than queens in PP-45 QMCS (BB: p=0.029, GEE, Wald Chi-Square=4.8, df=1; FBB: p≤0.0001, Wald Chi-Square=22.5, df=1, FIG. 3). As in Experiment 1, time significantly affected egg laying (p≤0.0001, GEE, Wald Chi-Square=185.5, df=12). Egg laying increased throughout the experiment, and significantly more eggs were laid on Day 14 than 10 of the other 13 days of egg laying (Table 2). A significant interaction was detected between time and treatment (p≤0.0001, Wald Chi-Square=255.5, GEE, df=24). This interaction was observed in QMCS provisioned with FBB on Days 2-8 and 11-13 relative to QMCS provisioned with PP-45. In this case, egg laying on these days was increasing in QMCS provisioned with FBB but decreasing in those fed 45% pollen paste (Table 3). No significant interaction was observed in QMCS provisioned with BB. No differences in egg production were observed between QMCS provisioned with either BB or FBB (p=0.818, GEE, Wald Chi-Square=0.05, df=1).

Diet type significantly affected diet consumption in QMCS (p=0.0006, Kruskal Wallis test, Chi-Square=14.9). Significantly greater amounts of pollen diet were consumed by bees in QMCS provisioned with PP-45 relative to BB or FBB (BB: p=0.0002, Wilcoxon Rank Sum, Chi-Square=13.7, df=1; FBB: p=0.005, Chi-Square=8.0, df=1, FIG. 3). No differences in pollen consumption were detected between QMCS provisioned with BB or FBB QMCS (p=0.4, Wilcoxon Rank Sum, Chi-Square=0.7, df=1). A significant negative correlation was detected between time and pollen consumption (p≤0.0001, Spearman's ρ=−0.7).

Diet type had a significant effect on the average acini diameter in worker bees sampled on day 7 or 8 of this experiment (p≤0.0001, Kruskal Wallis test, Chi-Square=50.0). The average acini diameters were significantly different between each treatment group (BB vs. FBB: p=0.006, Wilcoxon Rank Sum, Chi-Square=7.5, df=1; BB vs. PP-45: p≤0.0001, Chi-Square=19.7, df=1; FBB vs. PP-45: p≤0.0001, Chi-Square=48.5, df=1, FIG. 3). The bees in QMCS provisioned with FBB had the highest average diameter followed by BB and PP-45 in that order.

Example 4. Effects of Frozen Bee Bread Vs. 70% Pollen Paste on Egg Laying

As in Experiment 2, a significant effect of diet type on egg laying was observed (p=0.019, GEE, Wald Chi-Square=5.5, df=1, FIG. 4). As in Experiments 1 and 2, time significantly affected egg laying (p≤0.001, GEE, Wald Chi-Square=204.8, df=7). Egg laying increased until Days 6 and 7, and then began to decline. Relative to Day 10, egg laying on 6 of 7 days was significantly different, but the directionality of the model estimates shifted approximately midway through the experiment. Egg laying on Days 3-5 was lower relative to Day 10, but it was significantly higher on Days 7-9, indicating that peak performance was achieved during this time (Table 2). A significant interaction was detected between time and treatment (p≤0.005, GEE, Wald Chi-Square=20.1, df=7). The interaction was evident on Days 3-5, when egg laying was higher on average in QMCS provisioned with FBB rather than PP-70. The directionality indicates that egg laying in QMCS provisioned with FBB was not increasing as steeply as egg laying in QMCS provisioned with PP-70. Eventually, egg laying in both of these groups appeared to plateau, and the interaction was no longer evident (Table 3).

No significant difference in pollen consumption was detected between treatments (p=0.5, Wilcoxon Rank Sum, Chi-Square=0.4, df=1, FIG. 4). A significant negative correlation was detected between time and pollen consumption (p≤0.0001, Spearman's ρ=−0.7).

Example 5. Methods

Bees

Honeycomb frames containing capped worker brood (pupae and older larvae) were obtained from colonies maintained according to standard commercial methods at the Bee Research Facility at the University of Illinois Urbana-Champaign, Urbana, Ill. (UIUC) during May-September 2017. They were placed in a warm room (34.5° C.) until adult eclosion. Newly eclosed worker bees were brushed off the frames and added to QMCS by weight (100 bees=approximately 10 g). A random mix of bees from 2-3 colonies were used for each experiment, which involved 20-45 cages. Naturally mated queens of primarily Carniolan (subspecies) stock were purchased from Olivarez Honey Bees (Orland, Calif.).

Diets

Bee bread was collected from colonies by placing frames of empty honeycombs in the center of the brood nest for three days. They were then removed and the bee bread was harvested from the honeycomb cells. Fresh bee bread (BB) was fed to the caged bees after it was harvested without having been subjected to temperatures below 20° C. Bee bread from the same frames was also harvested and stored in a freezer at −80° C. for at least 1 h before being thawed and fed to the caged bees (FBB). All of the bee bread in these experiments was stored in the colony for approximately 72 h based on research showing that nurse bees prefer freshly stored bee bread. See supplemental methods for further details on bee bread collections.

Commercial pollen was purchased from Betterbee Bee Supply (Greenwich, N.Y.). Pollen paste diets were made using ground, commercial pollen stored at −20° C. The diets were made less than one hour prior to use according to the following recipe:

45% pollen paste (PP-45)—45% commercial pollen, 35% local honey, 20% sucrose solution (30% w/v).

70% pollen paste (PP-70)—70% commercial pollen, 30% local honey.

Percentages were estimated by weight.

In addition to pollen diet, QMCS were supplied with feeders containing honey, water, and 30% sucrose solution, each administered in 2 mL or 5 mL feeders.

Incubator

QMCS were maintained in a Percival incubator with stable environmental conditions of 34°±0.5° C. and 60%+ 10% relative humidity (RH), similar to the conditions inside a normal bee hive.

Experiment 1: Effects of Bee Bread Vs. 45% Pollen Paste on Egg Laying

From Jul. 19-20, 2017, 20 QMCS were assembled containing 100 newly eclosed worker bees and a queen. Ten QMCS were provisioned with bee bread (BB), and 10 were provisioned with 45% commercial pollen paste (PP-45). Eggs were counted twice daily between 9-11:00 and again between 18-20:00. After counting, the eggs were tapped out of the ELPs, which were then reinserted to the QMCS. Pollen diet consumption was measured every 2 days by removing feeders and recording the lost weight. After measurements were taken, the pollen feeders were replaced with feeders containing either freshly collected bee bread or 45% commercial pollen paste according to treatment group. Egg laying was tracked in each cage for 13 days. Styles 1 and 2 QMCS were used for this experiment, and cage styles were distributed equally between experimental groups.

Experiment 2: Effects of Fresh Bee Bread Vs. Frozen Bee Bread Vs. 45% Pollen Paste on Egg Laying From Aug. 10-12, 2017, 45 QMCS were assembled containing 300 newly eclosed worker bees and a queen. Groups of 15 QMCS were provisioned with either fresh bee bread (BB), frozen bee bread (FBB), or 45% commercial pollen paste (PP-45). BB and FBB were harvested from the same frames as described above. Egg laying and pollen consumption were monitored as described above. Every 2 days during the experiment pollen feeders were again replaced with feeders containing fresh diet, and 10 bees were removed through an empty feeder port using soft tweezers. The subsampled bees were flash-frozen in liquid nitrogen and stored at −80° C. until they were dissected for HPG acinus measurement. Egg laying was tracked in each cage for 14 days. Style 3 QMCS were used during this trial, and a higher number of worker bees were added to each cage to accommodate the subsampling of worker bees and to determine whether a larger number of bees would result in dramatically better egg laying performance.

Bees subsampled on August 18 from 39 of the QMCS (14 BB, 13 FBB, and 12 PP-45) were selected for HPG dissection and measurement of acinus size. HPG dissections were performed by first removing the bee heads over dry ice, and the exoskeleton was chipped off in ethanol chilled with dry ice. The heads were then transferred to room temperature ethanol, and the glands were removed using a pair of forceps under an Olympus Szx12 stereomicroscope. Morphological measurements of the acini were performed on stored images taken with the stereo microscope as described by Hrassnigg et al. The average diameter of 10 acini from each bee was measured using the straight-line tool in ImageJ.

Experiment 3: Effects of Frozen Bee Bread Vs. 70% Pollen Paste on Egg Laying On Oct. 14, 2017, 30 cages were assembled containing 200 newly eclosed worker bees and a queen. Fifteen of the cages were provisioned with bee bread stored at −80° C. (FBB) and the other 15 were provisioned with 70% commercial pollen paste (PP-70). Egg laying and pollen consumption was monitored as in Experiments 1 and 2. Every 2 days during the experiment, pollen feeders were replaced with feeders containing fresh diet. Egg laying was monitored and recorded daily for 10 days. The cages were disassembled on the 11$^{th}$ day due to observations of heavy mortality of worker bees. Style 3 QMCS were used during this trial, and an intermediate number of worker bees were added to each cage in this experiment to accommodate the larger size of the cages.

Statistical Analyses

Poisson loglinear generalized estimating equations (GEE) with unstructured correlation matrices (IBM SPSS Statistics® 24) were used to assess the effects of pollen diet on egg laying across time. GEE analysis accounts for within-subject variation and does not exclude subjects with incomplete datasets (as in the case of a queen death), and the β-coefficients can be used to estimate the magnitude and direction of significant effects. Commercial pollen paste (PP-45 or PP-70) was used as the baseline for egg laying comparisons, and the last day of each trial was used as the baseline for temporal comparisons. In Experiment 2, no egg laying was observed in one or more treatments on the first monitoring day. To conform to the assumptions of the GEE analysis, these days were excluded from the GEE. In Experiment 3, no egg laying was observed in either treatment for the first 2 days of monitoring. These days were excluded from the GEE and additionally were not used to calculate average daily egg production. Based on the structure of the data and the experimental design, an unstructured correlation matrix was selected. Wald Chi-Squared tests were used for post hoc comparisons between treatments and time points. To identify differences in pollen consumption between treatment groups, Wilcoxon Rank Sum tests and Kruskal Wallis tests were performed in JMP Pro© 12. Correlations between time and pollen consumption were assessed using Spearman's ρ, estimated using JMP© Pro 12.

TABLE 1

Average eggs laid per day, maximum eggs laid per day, and laying vs. non-laying queens by experiment and treatment.

|  |  | Average eggs laid in 24 hours ± SE | Maximum eggs laid in 24 hours | Laying queens/Non-laying queens |
|---|---|---|---|---|
| Experiment 1 | Bee Bread | 119.7 ± 10.5 | 456 | 10/0 |
|  | 45% Pollen Paste | 93.7 ± 10.6 | 408 | 8/2 |
| Experiment 2 | Bee Bread | 98 ± 7.6 | 434 | 15/0 |
|  | Frozen Bee Bread | 106 ± 6.8 | 378 | 14/1 |
|  | 45% Pollen Paste | 35 ± 4 | 246 | 13/2 |
| Experiment 3 | Frozen Bee Bread | 110 ± 9.7 | 355 | 14/1 |
|  | 70% Pollen Paste | 83.4 ± 8.1 | 395 | 15/0 |

TABLE 2

Effects of workers age on queen egg laying (GEE, Wald Chi-Square post hoc test).

| Experiment | Day | β-coefficient | Wald Chi-Square | p-value |
|---|---|---|---|---|
| 1 | 1 | −5.8 ± 1.2 | 24.2 | <0.001 |
| 2 | 2 | 1.4 ± 0.7 | 4.5 | 0.034 |
| 2 | 3 | 2.1 ± 0.6 | 11.2 | 0.001 |
| 2 | 4 | 1.8 ± 0.7 | 6.2 | 0.013 |
| 2 | 5 | 2.2 ± 0.7 | 10.5 | 0.001 |
| 2 | 6 | 2.1 ± 0.6 | 12.5 | <0.001 |
| 2 | 7 | 1.9 ± 0.6 | 11.2 | 0.001 |
| 2 | 11 | 1.6 ± 0.7 | 5.9 | 0.015 |
| 2 | 12 | 1.7 ± 0.6 | 9.4 | 0.002 |
| 2 | 13 | 1.0 ± 0.5 | 14.2 | <0.001 |
| 3 | 3 | −4.0 ± 0.7 | 34 | <0.001 |
| 3 | 4 | −1.6 ± 0.4 | 16.5 | <0.001 |
| 3 | 5 | −0.5 ± 0.2 | 6.3 | 0.012 |
| 3 | 7 | 0.6 ± 0.2 | 14.3 | <0.001 |
| 3 | 8 | 0.4 ± 0.2 | 4.7 | 0.3 |
| 3 | 9 | 0.3 ± 0.1 | 5 | 0.03 |

TABLE 3

Significant interaction effects of pollen diet and time on egg laying (GEE, Wald Chi-Square post hoc test).

| Experiment | Day | Treatments compared | β-coefficient | Wald Chi Square | p-value |
|---|---|---|---|---|---|
| 1 | 1 | BB vs. PP-45 | 5.5 ± 1.3 | 16.9 | <0.001 |
| 2 | 2 | FBB vs. PP-45 | −3.6 ± 0.9 | 14.5 | <0.001 |
| 2 | 3 | FBB vs. PP-45 | −3.3 ± 0.8 | 18.5 | <0.001 |
| 2 | 4 | FBB vs. PP-45 | −2.6 ± 0.7 | 10.9 | 0.001 |
| 2 | 5 | FBB vs. PP-45 | −2.7 ± 0.7 | 13.9 | <0.001 |
| 2 | 6 | FBB vs. PP-45 | −2.7 ± 0.6 | 18.5 | <0.001 |
| 2 | 7 | FBB vs. PP-45 | −2.4 ± 0.6 | 15.1 | <0.001 |
| 2 | 8 | FBB vs. PP-45 | −1.5 ± 0.7 | 5.2 | 0.022 |
| 2 | 11 | FBB vs. PP-45 | −1.8 ± 0.7 | 6.7 | 0.01 |
| 2 | 12 | FBB vs. PP-45 | −2.2 ± 0.6 | 11.9 | 0.001 |
| 2 | 13 | FBB vs. PP-45 | −2.1 ± 0.6 | 13.2 | <0.001 |
| 3 | 3 | FBB vs. PP-70 | 2.4 ± 0.8 | 9.8 | 0.002 |
| 3 | 4 | FBB vs. PP-70 | 1.2 ± 0.5 | 6.5 | 0.11 |
| 3 | 5 | FBB vs. PP-70 | 0.7 ± 0.3 | 5.8 | 0.016 |

Table 2: Effects of workers age on queen egg laying (GEE, Wald Chi-Square post hoc test).

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A queen monitoring cage system comprising:
   a housing having a top wall, opposing sidewalls, and a base wall defining a cavity configured to receive and contain a plurality of honey bees;
   a removable egg laying plate engaged with the opposing sidewalls and serving as rear wall of the housing to define the cavity, the egg laying plate comprising a plurality of hexagonal cells extending into the cavity, wherein the opposing sidewalls include slots extending vertically between the base wall of the housing and the top wall of the housing, the removable egg laying plate slidably positioned in the slots;
   a lid engaged with the opposing sidewalls and serving as a front wall of the housing to define the cavity, the lid positioned opposite the egg laying plate and spaced away from the hexagonal cells a predetermined distance to allow passage of honey bees therebetween;
   a removable drawer positioned in the housing to allow introduction to the cavity and removal from the cavity of honey bees; and
   an insert slidably positioned between the drawer and the cavity to close off all access by the honey bees between the cavity and the drawer.

2. The queen monitoring cage system of claim 1, wherein the slots include a first set of slots and a second set of slots, the removable egg laying plate slidably positioned in the first set of slots and the lid slidably positioned in the second set of slots to abut the base wall.

3. The queen monitoring cage system of claim 1, wherein the top wall is proximate an end of the opposing sidewalls and the base wall is proximate an opposite end of the opposing sidewalls, the top wall and the base wall extending transversely with respect to the opposing sidewalls, the egg laying plate, and the lid.

4. The queen monitoring cage system of claim 1, wherein the egg laying plate and the lid abut a planar surface of the base wall and extend past the top wall.

5. The queen monitoring cage system of claim 1, wherein the slots in which the removable egg laying plate is slidably positioned are a first set of slots and wherein the queen monitoring cage system further comprising an adaptor engaged with the opposing sidewalls by being slidably positioned in a second set of slots adjacent the first set of slots, the adaptor having a plurality of hexagonal shaped apertures configured to align with the hexagonal cells of the egg laying plate.

6. The queen monitoring cage system of claim 5, wherein the second set of slots are positioned with respect to the first set of slots such that the adaptor is contiguously aligned with the egg laying plate.

7. The queen monitoring cage system of claim 1, further comprising an insert configured for introduction to the housing proximate the egg laying plate in engagement with the opposing sidewalls and the base wall to segregate the egg laying plate from the cavity.

8. The queen monitoring cage system of claim 1, wherein the housing is formed to include a slot proximate a base of the housing, the slot sized to receive a removable drawer.

9. A queen monitoring cage system comprising:
   an egg laying plate comprising a plurality of hexagonal cells in a repeating predetermined pattern;
   a housing comprising a plurality of walls defining an interior cavity, the egg laying plate removably disposed in the housing such that a bottom of the hexagonal cells form a wall in the housing, and the hexagonal cells extend away from the bottom into the interior cavity a first predetermined distance to form an entrance to each of the hexagonal cells; and
   a removable wall included among the plurality of walls of the housing, the removeable wall positioned opposite the egg laying plate to define a second predetermined distance between the entrance to each of the hexagonal cells of the egg laying plate and the removable wall, the second predetermined distance being a bee space to accommodate passage of honeybees between the egg laying plate and the removable wall, wherein at least some of the walls of the housing are not removable and include slots, the slots configured to slidably receive a flange of the egg laying plate and rigidly maintain position of the egg laying plate and the removeable wall with respect to the housing, the flange having a thickness less than the first predetermined distance.

10. The queen monitoring cage system of claim 9, wherein the plurality of walls and the egg laying plate are translucent.

11. The queen monitoring cage system of claim 9, wherein the housing is made of plexiglass or polystyrene.

12. The queen monitoring cage system of claim 9, wherein the plurality of walls include one or more ports through which materials can be inserted into the housing, the materials selected from the group consisting of honey, water, sucrose solution, and pollen.

13. The queen monitoring cage system of claim 9, further comprising an insert selectively received in the housing to isolate the egg laying plate from the interior cavity.

14. A method of queen monitoring comprising:
   inserting an egg laying plate in a housing, the egg laying plate comprising a plurality of hexagonal cells in a repeating predetermined pattern;
   inserting a lid in the housing, the lid positioned in the housing opposite the egg laying plate to create a predetermined space between the egg laying plate and the lid, the predetermined space being a cavity in which honey bees are contained;
   introducing a queen bee and a plurality of honeybees into the predetermined space between the egg laying plate and the lid;
   supplying honey bee food into the housing through apertures in the housing to nourish the plurality of honeybees;
   partitioning the predetermined space with an insert to separate the honey bees and the queen bee from the egg laying plate;
   removing from the housing and replacing the egg laying plate without removing the honeybees or the queen bee from the predetermined space;
   sliding a drawer into the cavity to introduce additional bees into the housing; and
   separating the drawer from the predetermined space by an insert slidably positioned between the drawer and the predetermined space to eliminate access to the drawer by the honeybees occupying the predetermined space.

15. The method of claim 14, further comprising inserting an adapter into the housing between the egg laying plate and the cavity to contiguously contact the egg laying plate and isolate the honeybees from the egg laying plate.

16. The queen monitoring cage system of claim 9, further comprising an adaptor removably positioned in the housing in contiguous alignment with the egg laying plate such that each of a plurality of hexagonal apertures included in the adaptor align with the entrance to each of the hexagonal cells.

17. The queen monitoring cage system of claim 1, wherein the slots in the opposing side walls that extend vertically between the base wall of the housing and the top wall of the housing are first slots, and the queen monitoring cage system further comprising second slots in the opposing side walls, the second slots being perpendicular to the first slots and positioned in the sidewalls between the drawer and the cavity to receive the insert.

18. The queen monitoring cage system of claim 17, further comprising a queen excluder removably positioned between the drawer and the cavity to prevent a queen bee in the cavity from entering the drawer.

\* \* \* \* \*